United States Patent
Sankarasubramanian et al.

(10) Patent No.: US 11,894,590 B2
(45) Date of Patent: Feb. 6, 2024

(54) ELECTRODE-DECOUPLED REDOX FLOW BATTERY

(71) Applicant: Washington University, St. Louis, MO (US)

(72) Inventors: Shrihari Sankarasubramanian, St. Louis, MO (US); Vijay Ramani, St. Louis, MO (US)

(73) Assignee: Washington University, St. Louis, MO (US)

( * ) Notice: Subject to any disclaimer, the term of this patent is extended or adjusted under 35 U.S.C. 154(b) by 169 days.

(21) Appl. No.: 17/305,422

(22) Filed: Jul. 7, 2021

(65) Prior Publication Data

US 2022/0013800 A1 Jan. 13, 2022

Related U.S. Application Data

(60) Provisional application No. 63/050,345, filed on Jul. 10, 2020.

(51) Int. Cl.
*H01M 8/18* (2006.01)
*H01M 4/94* (2006.01)

(52) U.S. Cl.
CPC .............. *H01M 8/188* (2013.01); *H01M 4/94* (2013.01); *H01M 2300/0011* (2013.01)

(58) Field of Classification Search
CPC ................................................ H01M 8/18–20
See application file for complete search history.

(56) References Cited

U.S. PATENT DOCUMENTS

| | | | |
|---|---|---|---|
| 6,986,966 B2 | 1/2006 | Clarke et al. | |
| 9,947,481 B2 | 4/2018 | Solomon et al. | |
| 2001/0028977 A1* | 10/2001 | Kazacos | H01M 8/20 429/188 |
| 2017/0054160 A1* | 2/2017 | Tarrant | H01M 8/188 |
| 2018/0085744 A1* | 3/2018 | Helms | C08J 5/2256 |
| 2019/0044158 A1* | 2/2019 | Wang | H01M 4/368 |
| 2022/0166043 A1* | 5/2022 | Araki | H01M 8/188 |

FOREIGN PATENT DOCUMENTS

WO 2020028374 A1 2/2020

OTHER PUBLICATIONS

Sankarasubramanian et al., "Methanesulfonic acid-based electrode-decouppled vanadium-cerium redox flow battery exhibits significantly improved capacity and cycle life", Royal Society of Chemistry, 2019, DOI: 10.1039/c9se00286c, 9 pages.

Wang et al., "Engineering block co-polymer anion exchange membrane domains for highly efficient electrode-decoupled redox flow batteries", Royal Society of Chemistry, 2021, DOI: 10.1039/d1se00543j, 11 pages.

Darling et al., "Transport Property Requirements for Flow Battery Separators", Journal of the Electrochemical Society, 2016, vol. 163, No. 1, pp. A5029-A5040.

* cited by examiner

*Primary Examiner* — Scott J. Chmielecki
(74) *Attorney, Agent, or Firm* — Armstrong Teasdale LLP

(57) ABSTRACT

Described herein is a novel electrode-decoupled redox flow battery, a novel reinforced electrode-decoupled redox flow battery, and methods of using same to store energy. Advantages of these novel electrode-decoupled redox flow batteries include long life, excellent rate capability, and stability.

12 Claims, 29 Drawing Sheets

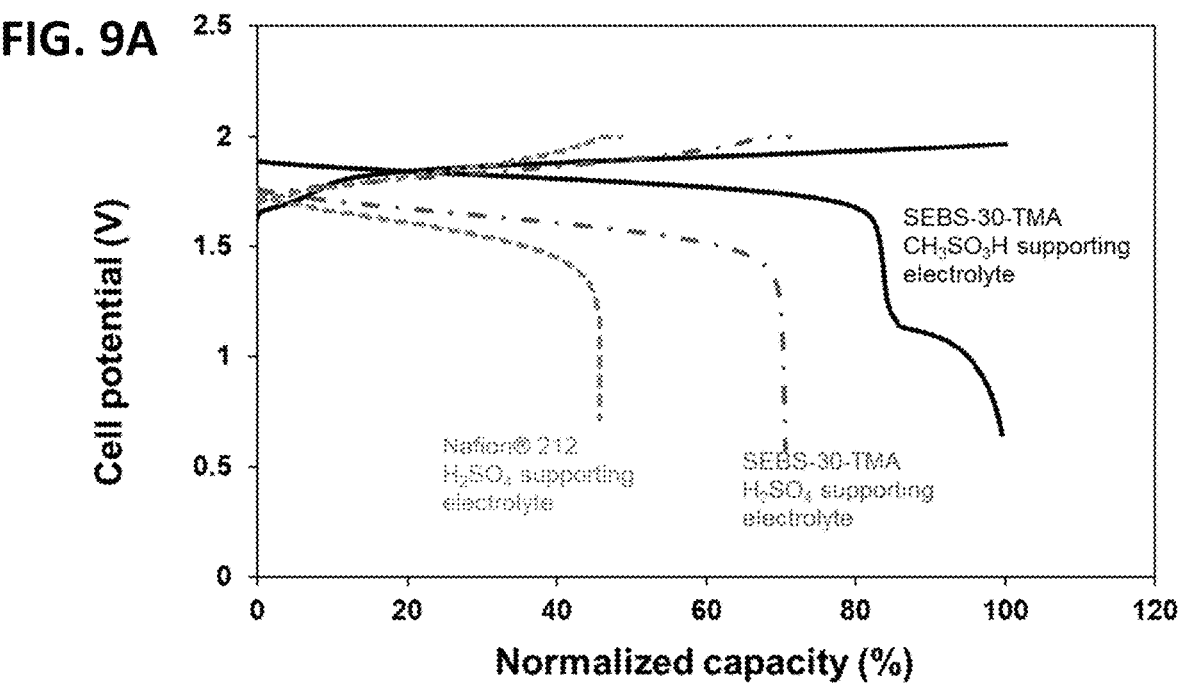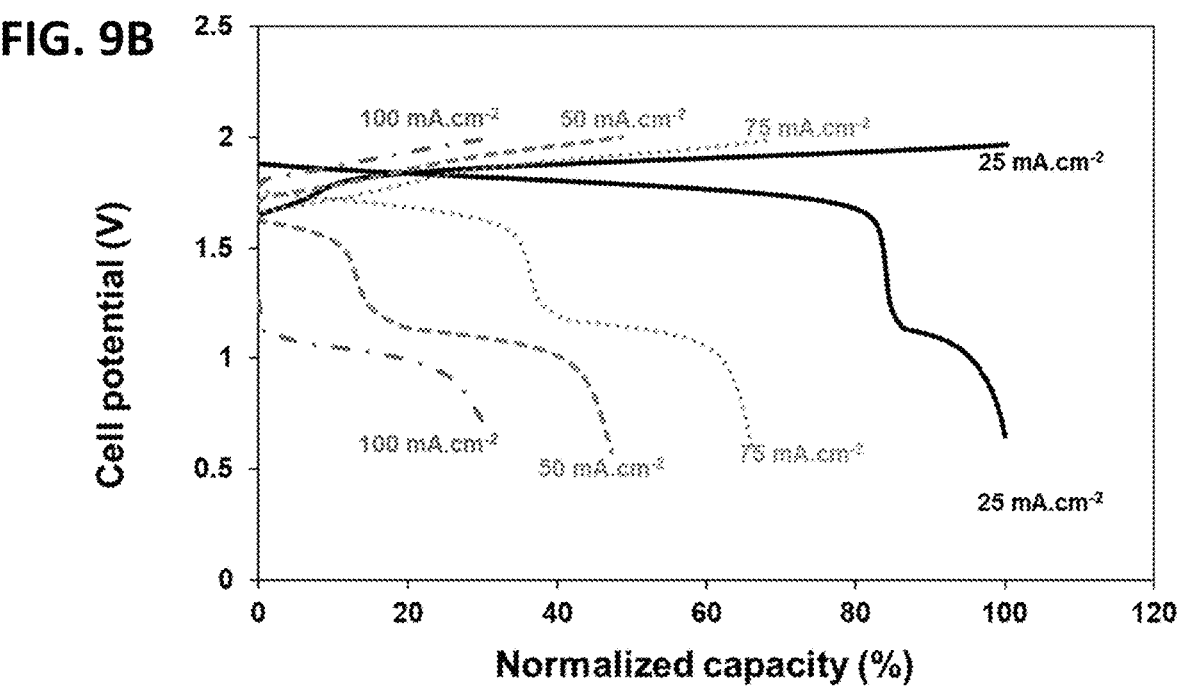

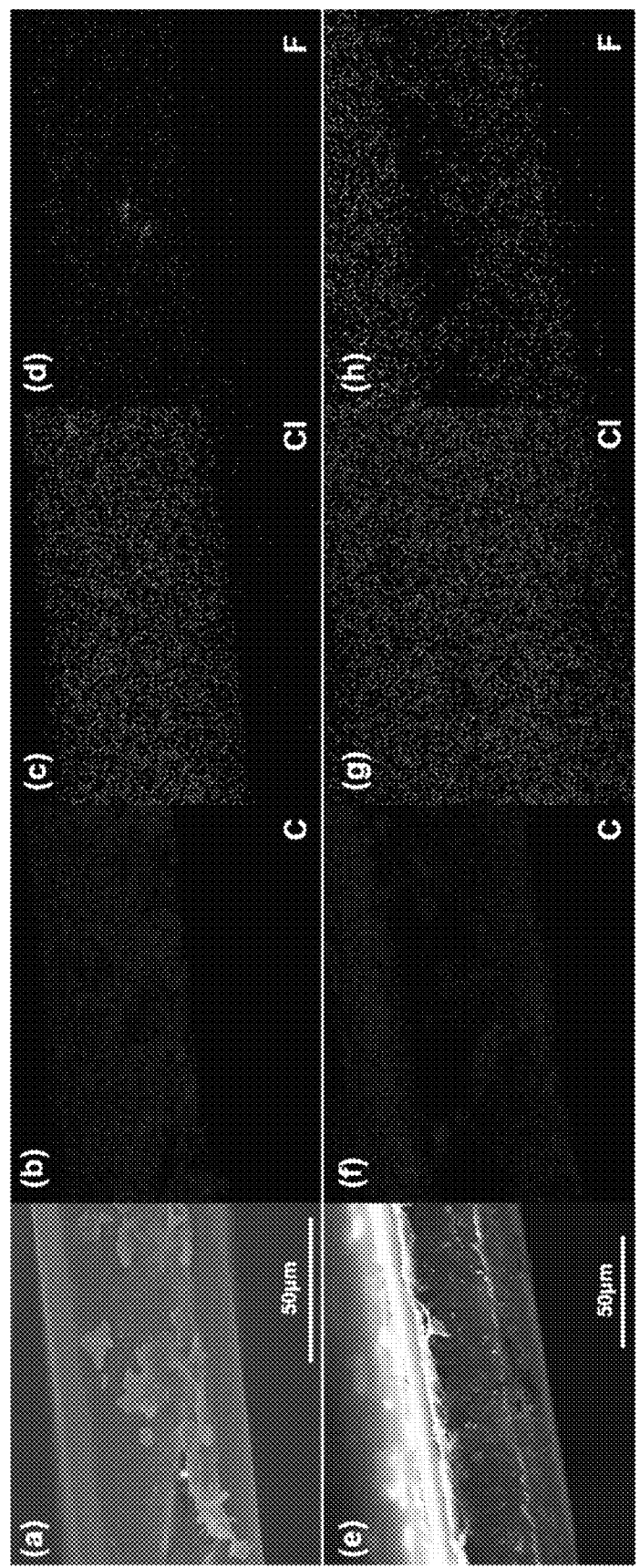

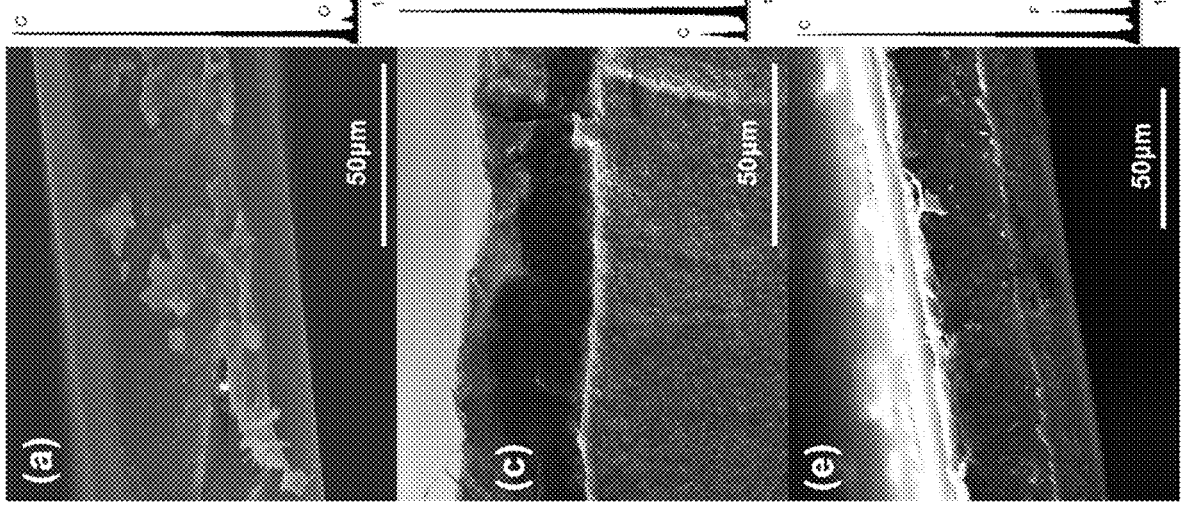

ELECTRODE-DECOUPLED REDOX FLOW BATTERY

CROSS-REFERENCE TO RELATED APPLICATIONS

This application claims the benefit of priority to U.S. Provisional Application No. 63/050,345 filed Jul. 10, 2020, the contents of which is hereby incorporated by reference in its entirety.

GOVERNMENT SUPPORT CLAUSE

This invention was made with government support under DE-AR0000768 awarded by the U.S. Department of Energy—Advanced Research Projects Agency—Energy (ARPA-E). The government has certain rights in the invention.

FIELD OF THE DISCLOSURE

Described herein is a novel electrode-decoupled redox flow battery and methods of using a novel electrode-decoupled redox flow battery to store energy. Advantages of this novel electrode-decoupled redox flow battery include long life, excellent rate capability, and stability.

BACKGROUND OF THE DISCLOSURE

The need to ensure the reliability and resiliency of the grid is greater than ever due to the market-driven increase in the penetration of intermittent renewable energy sources. Grid-scale energy storage systems such as redox flow batteries (RFBs) are excellent candidates for this application. RFBs are a special class of electrochemical energy storage system where the electroactive materials are stored outside the cell or battery itself. This arrangement decouples the energy and power obtainable from a given unit as the energy is a function of the amount of externally stored electroactive material while the power is a function of the stack size and chosen electroactive materials. This in turn ensures that the cost of these systems scale sub-linearly.

RFBs have been investigated over the past forty years with Fe—Cr, all-V, Zn—Ce, and all-Fe chemistries being the subject of substantial research focus. The challenges include reducing the cost, reducing side reactions and (in case of chemistries where plating is involved) addressing dendrite-driven failure modes. More recently, aqueous RFBs with organic electrolytes and non-aqueous RFBs have been investigated. These studies typically claim substantial cost savings (upon eventual mass-production of the demonstrated lab-scale actives) while achieving improved performance and stability. A key challenge in these systems is to ensure long lifetime (in the tens of years) by minimizing capacity fade. A major cause of capacity fade is the mixing of the anolyte and catholyte with half the dissolved actives being rendered inactive at the anode and cathode respectively. Possible solutions to this issue include the use of elemental actives soluble at multiple oxidation states (such as V), equimolar anolyte-catholyte solutions as electrolytes (sacrificing 50% of theoretical volumetric capacity), or the use of large redox active molecules in conjunction with size-selective separators. The use of a highly permselective anion exchange membrane (AEM) as the separator eliminates all the above restrictive conditions. A much broader ranges of elemental active species can be used in an electrode-decoupled manner (i.e. different cationic actives at the catholyte and anolyte) without mixing based capacity fade.

One chemical embodiment is the all-V RFB. The all-V RFB eliminates mixing based capacity fade modes by utilizing different oxidation states of vanadium at the anode and cathode (allowing for the use of cation exchange membrane separators). The redox potentials of the vanadium couples used ensure a >1 V cell voltage and no significant hydrogen evolution or oxygen evolution reactions. The electrode reactions of an all-V RFB are as follows:

$$V^{3+}+e^- \leftrightarrow V^{2+} (E^0=-0.26\ V) \quad \text{(Equation 1)}$$

$$VO^{2+}+e^- \leftrightarrow VO_2^+ (E^0=1.00\ V) \quad \text{(Equation 2)}$$

The high cost of vanadium, the relatively low cell voltage and the $VO_2^+$ induced degradation of the membrane separators are all major disadvantages of this system. These issues have previously been addressed by demonstrating anion exchange membrane separator based V—Ce RFBs that are electrode-decoupled (i.e. ideally no mixing of anolyte and catholyte) with a theoretical OCV of 1.87 V by replacing the $VO^{2+}/VO_2^+$ couple with the $Ce^{3+}/Ce^{4+}$ couple (a schematic is shown in FIG. 1).

The $Ce^{3+}/Ce^{4+}$ redox reaction is as follows:

$$Ce^{4+}+e^- \leftrightarrow Ce^{3+} (E^0=1.61\ V) \quad \text{(Equation 3)}$$

The major drawback of these batteries is that the Ce electrolyte has a relatively low solubility of 0.5 M in the typical $H_2SO_4$ supporting electrolyte, leading to a maximum theoretical volumetric capacity of 13.4 Ah.$L^{-1}$. The present application addresses this problem by reformulating the electrolyte using methanesulfonic acid as the supporting electrolyte. This is the first demonstration of an electrode-decoupled V—Ce system with methanesulfonic acid-based electrolytes on both the V and Ce sides.

Ce electrolytes with methanesulfonic acid as the supporting electrolyte have been previously employed in other Ce RFBs such as the Zn—Ce and Pb—Ce systems. A mixed sulfuric acid-methanesulfonic acid supported V—Ce RFB, where a cation exchange membrane (CEM) separator is employed, inevitably led to cation cross-over and capacity fade. The resultant drastic capacity fade is a possible reason for no long-term cycling data. A V—Ce system using $H_2SO_4$ supported V electrolyte and a $CH_3SO_3H$ supporting Ce electrolyte, which employs a CEM that readily permits cation cross-over, and an electrolyte formulation with different acids across the membrane, leads to osmotic pressure differences that exacerbate cation cross-over. The capacity fade is dramatic within three cycles and highly impractical for energy storage over the decadal timescales. In contrast as described herein below, the present application reduces capacity fade to 2.4% over 100 cycles.

In a similar context, the increasing deployment of renewable energy sources and associated energy storage using batteries or $H_2/H_2$ carriers are compelling future routes towards a carbon-neutral energy ecosystem. The rapid adoption and deployment of renewable energy sources is increasingly an economical inevitability with the levelized costs of terrestrial solar and wind installations being much lower than conventional coal, nuclear or oil-based power plants. These developments require suitable energy storage solutions, and a promising solution is the use of redox-flow batteries (RFBs). Compared with other electricity energy storage systems such as rechargeable metal-air batteries and metal-ion batteries, RFBs have been demonstrated to have competitive features including low storage capacity cost, long battery lifetime, and high energy efficiency. Many RFB systems have drawn researchers' attention such as all-vanadium, all-uranium, and electrode-decoupled (ED-) RFBs (i.e. RFBs that use different redox couples at the anode and the cathode) such as iron-vanadium, vanadium-cerium, iron-chromium, zinc-nickel, zinc-cerium, and zinc-bromine. The introduction and assessment of these different RFB chemistries also introduces the issue of identifying comparison metrics to assess these systems. Yao et al. illustrates the various pitfalls in reporting RFB data and comparing different systems. A comprehensive program examining these various RFB chemistries in light of technical and techno-economic performance is needed to deploy commercially viable systems.

The all-vanadium redox flow battery (VRFB) is the most commercially mature system due to its long-life, mild operating temperature range and because the intermixing of the anolyte and catholyte results only in an easily remedied loss in capacity and energy efficiency in the VRFB. Nevertheless, VRFBs suffer from low standard cell voltage (1.26 V) and the oxidative degradation of hydrocarbon-based membrane separators caused by the vanadium (V) cation requires the use of fluorocarbon-based membranes as separators.

ED-RFBs use anion exchange membrane (AEM) separators (as opposed to cation exchange membranes used in the VRFB) to enable to use of different cationic redox couples at the anolyte and catholyte. The key factor that enables the high performance of the ED-RFB is to equip the ED-RFB with ion exchange separators with high permselectivity. The use of Nafion® or similar cation exchange membranes (CEMs) in these systems is impossible as these CEMs will allow the facile transfer of cations from one electrode to the other, thereby precluding realization of a true ED-RFB. As an example of the various approaches adopted to improve permselectivity, Li et al. drop casted a layer of Ketjen black carbon on both sides of Nafion® membrane for polysulfide-iodide RFB. Due to the large surface area of the Ketjen black carbon, both polysulfide and polyiodide ions were trapped during the charge-discharge cycle. As the charges accumulated in the carbon, the same anions were prevented from entering the membrane due to the electrostatic repelling effect. At the same time, the Ketjen black carbon added more electronic conductivity and less water uptake to the Nafion® membrane. Li et al. were able to operate the polysulfide-iodide RFB with modified Nafion® membrane for 1200 cycles (close to three months) while a maximum of 160 hours cycling was obtained for the same RFB with unmodified Nafion®. This work shows a novel approach to improve the permselectivity and prevent excessive water migration that helps to improve the battery performance.

In addition to high permselectivity, the development of mechanically and chemically robust AEMs is also imperative for enabling these systems. Amongst all the possible combinations of redox couples for ED-RFBs, the vanadium-cerium (V—Ce) ED-RFB has relative high cell voltage (the catholyte $Ce^{4+}/Ce^{3+}$ has a standard potential of 1.44 V vs. SHE compared with $V^{5+}/V^{4+}$ at 1 V vs. SHE), good reversibility and acceptable energy density. A schematic of a typical V—Ce ED-RFB is depicted in FIG. 1. Cardo-polyetherketone based AEMs for such ED-RFBs have been developed and showed that it is possible to achieve separation of the redox active cations over extended periods of time. Employing the same AEM but by modifying the solvation shell around the redox active cations by using methanesulfonic acid as the supporting electrolyte, cation cross-over was significantly reduced which enabled extended cycling of the V—Ce ED-RFB with no capacity fade. Moving to block co-polymers, polystyrene-block-poly (ethylene-ran-butylene)-block-polystyrene-based AEMs were developed and employed as separator in a V—Ce RFB. The separation of the hydrophilic and hydrophobic domains in these separators enabled tailoring of the cross-over of the cationic redox active species by changing the ratio of the styrene block (site of the functional group and hydrophilic) to the other hydrophobic blocks. Over 20 charge/discharge cycles, the RFB with the polystyrene-block-poly(ethylene-ran-butylene)-block-polystyrene-based AEM separator with 30 wt. % styrene (hereafter referred to as SEBS30) exhibited 10% capacity fade, while the loss in capacity rose to 15% for the same separator with 35 wt. % styrene (SEBS35) and was about 40% for the benchmark Nafion®212 separator. Therefore, it is desirable to significantly reduce the capacity fade per cycle from the previously exhibited 0.5% loss in capacity per cycle, which would be unacceptably large for viable commercial application. AEM separators for RFBs also face a common challenge of mechanical stability. For example, cardo-polyetherketone-based AEMs exposed ex situ to 1.5 M $VO_2^+$ in 3 M $H_2SO_4$ at 30° C. for 60 days led to the ultimate tensile strength of the AEM degrading from 19 MPa to 9 MPa. Thus, it is further desirable to improve the AEM's mechanical durability.

BRIEF DESCRIPTION OF THE DISCLOSURE

In one embodiment, the present disclosure is directed to a redox flow battery comprising a cathode; a catholyte comprising a transition metal ion and a first supporting electrolyte, wherein the transition metal ion and the first supporting electrolyte form a first solvation structure; an anode; an anolyte comprising a lanthanide ion and a second supporting electrolyte, wherein the lanthanide ion and the second supporting electrolyte form a second solvation structure; and a permselective ion exchange membrane separating the cathode and the catholyte from the anode and the anolyte.

In another embodiment, the present disclosure is directed to a method of using a redox flow battery, the method comprising using the redox flow battery to store energy, wherein the redox flow battery comprises a cathode; a catholyte comprising a transition metal ion and a supporting electrolyte, wherein the transition metal ion and the supporting electrolyte form a first solvation structure; an anode; an anolyte comprising a lanthanide ion and a supporting electrolyte, wherein the lanthanide ion and the supporting electrolyte form a second solvation structure; and a permselective ion exchange membrane separating the cathode and the catholyte from the anode and the anolyte.

BRIEF DESCRIPTION OF THE DRAWINGS

FIG. 9A is an exemplary embodiment of charge-discharge curves of a V—Ce ED-RFB in accordance with the present disclosure with different separators and supporting electrolytes.

FIG. 9B is an exemplary embodiment of charge-discharge curves of a V—Ce ED-RFB in accordance with the present disclosure at different current densities (CH$_3$SO$_3$H supporting electrolyte).

FIG. 14A shows a lab-scale process to prepare r-SEBS membranes. FIG. 14B shows a reaction scheme for functionalizing SEBS triblock copolymer to SEBS with quaternary ammonium (SEBS-TMA).

FIG. 15A shows FTIR spectra for a SEBS polymer backbone, SEBS following chloromethylation reactions, and CM-SEBS-TMA ionomer. FIG. 15B shows FTIR spectra for PTFE reinforcement, r-SEBS-TMA, and the same ionomeric membrane separator after the RFB test.

FIG. 16A shows the experiment at day 0. FIG. 16B shows the experiment at day 30. The cerium electrolyte is in the left-hand chamber and vanadium electrolyte is in the right-hand chamber.

FIGS. 17A-H are exemplary embodiments of scanning electron micrographs and EDAX mapping for SEBS-TMA and r-SEBS-TMA membranes in accordance with the present disclosure. FIG. 17A is cross-section of a SEBS-TMA membrane. FIG. 17B shows EDAX mapping of the SEBS-TMA membrane cross-section for carbon. FIG. 17C shows EDAX mapping of the SEBS-TMA membrane cross-section for chlorine. FIG. 17D shows EDAX mapping of the SEBS-TMA membrane cross-section for fluorine. FIG. 17E is cross-section of a r-SEBS-TMA membrane. FIG. 17F shows EDAX mapping of the r-SEBS-TMA membrane cross-section for carbon. FIG. 17G shows EDAX mapping of the r-SEBS-TMA membrane cross-section for chlorine. FIG. 17H shows EDAX mapping of the r-SEBS-TMA membrane cross-section for fluorine.

FIGS. 18A-F depict an exemplary embodiment of cross-sectional SEM images and corresponding EDAX spectra for various membranes in accordance with the present disclosure. FIG. 18A shows a cross-sectional SEM image of SEBS-TMA AEM. FIG. 18B shows a spot EDAX spectrum of SEBS-TMA AEM. FIG. 18C shows a cross-sectional SEM image of ePTFE reinforcement. FIG. 18D shows a spot EDAX spectrum of ePTFE reinforcement. FIG. 18E shows a cross-sectional SEM image of r-SEBS-TMA AEM. FIG. 18F shows a spot EDAX spectrum of r-SEBS-TMA AEM.

FIG. 24A shows membrane voltage profiles at cycle 1. FIG. 24B shows membrane voltage profiles at cycle 20.

FIG. 25A shows normalized capacity over cycling. FIG. 25B shows energy efficiency over cycling.

FIG. 27A depicts a block copolymer separator in dry state. FIG. 27B depicts a block copolymer separator after water imbibition. FIG. 27C depicts a reinforced block copolymer separator in dry state. FIG. 27D depicts a reinforced block copolymer separator after water imbibition. FIG. 27E shows correlation between IEC, water uptake and permselectivity for r-SEBS30-TMA disclosed herein, SEBS30-TMA reference data and SEBS35-TMA reference data.

DETAILED DESCRIPTION OF THE DISCLOSURE

Figure 1:
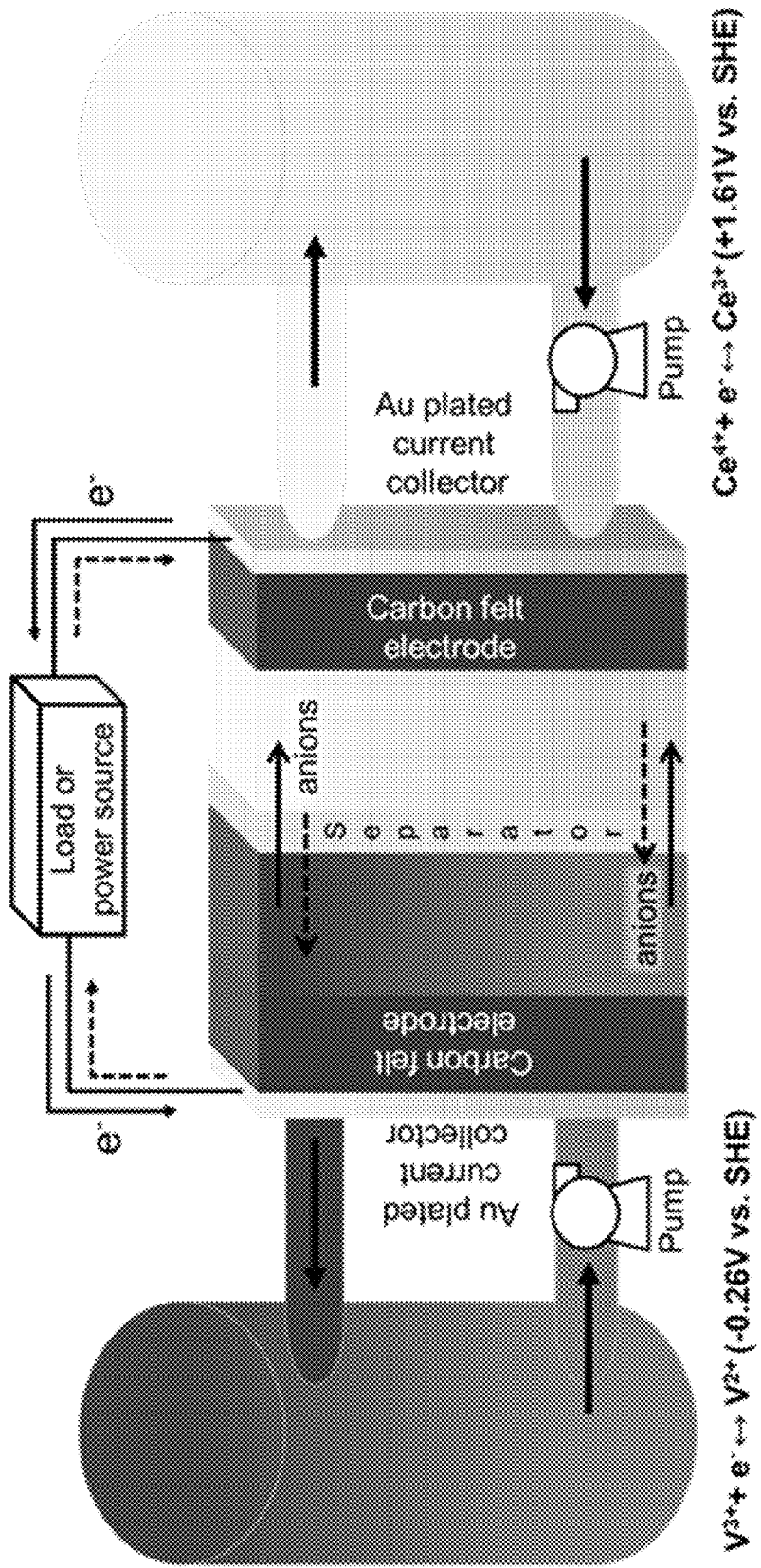
FIG. 1 is an exemplary embodiment of a schematic of an electrode-decoupled V—Ce redox flow battery in accordance with the present disclosure. The solid lines depict the direction of electron and anion movement during the charging process, while the dashed lines depict electron and anion flow during the discharge process.

Described herein is a novel redox flow battery comprising a cathode; a catholyte comprising a transition metal ion and a first supporting electrolyte, wherein the transition metal ion and the first supporting electrolyte form a first solvation structure; an anode; an anolyte comprising a lanthanide ion and a second supporting electrolyte, wherein the lanthanide ion and the second supporting electrolyte form a second solvation structure; and a permselective ion exchange membrane separating the cathode and the catholyte from the anode and the anolyte.

In some embodiments, the first solvation structure and the second solvation structure are sufficiently bulky to minimize cross-over of the transition metal ion and the lanthanide ion. Appropriate solvation structure sizes depend on the permselective ion exchange membrane and are known in the art (see, for example, Journal of The Electrochemical Society, 163 (1) A5029-A5040 (2016)).

In some embodiments, the first solvation structure and the second solvation structure each independently have a diameter in the range of from about 0.1 nm to about 3 nm.

In some embodiments, the first supporting electrolyte and the second supporting electrolyte are identical. In some embodiments, the first supporting electrolyte and the second supporting electrolyte comprise different electrolytic species.

In some embodiments, at least one of the first supporting electrolyte and the second supporting electrolyte do not comprise sulfuric acid.

In some embodiments, the first supporting electrolyte and the second supporting electrolyte are each independently a sulfonic acid. In some embodiments, the first supporting electrolyte and the second supporting electrolyte are each independently a sulfonic acid selected from the group consisting of alkyl sulfonic acids, aryl sulfonic acids, methanesulfonic acid, ethanesulfonic acid, benzenesulfonic acid, o-toluenesulfonic acid, m-toluenesulfonic acid, p-toluenesulfonic acid, halogenated derivatives thereof, and combinations thereof.

In some embodiments, the sulfonic acid is a halogenated sulfonic acid derivative, wherein the halogenated sulfonic acid derivative comprises at least one halogen atom selected from the group consisting of fluorine, chlorine, bromine, and iodine. In some embodiments, the sulfonic acid is a halogenated sulfonic acid derivative, wherein the halogenated sulfonic acid derivative comprises at least two halogen atoms selected from the group consisting of fluorine, chlorine, bromine, and iodine. In some embodiments, the sulfonic acid is a halogenated sulfonic acid derivative, wherein the halogenated sulfonic acid derivative comprises at least three halogen atoms selected from the group consisting of fluorine, chlorine, bromine, and iodine. In some embodiments, the sulfonic acid is a halogenated sulfonic acid derivative, wherein the halogenated sulfonic acid derivative is fully substituted by halogen atoms.

In some embodiments, the anolyte is present in a relatively high concentration. In some embodiments, the anolyte is present in a concentration of at least 0.3M. In some embodiments, the anolyte is present in a concentration of at least 0.4M. In some embodiments, the anolyte is present in a concentration of at least 0.5M. In some embodiments, the anolyte is present in a concentration of at least 0.6M. In some embodiments, the anolyte is present in a concentration of at least 0.7M. In some embodiments, the anolyte is present in a concentration of at least 0.8M. In some embodiments, the anolyte is present in a concentration of at least 0.9M. In some embodiments, the anolyte is present in a concentration of at least 1M. In some embodiments, the anolyte is present in a concentration of at least 1.1M. In some embodiments, the anolyte is present in a concentration of at least 1.5M. In some embodiments, the anolyte is present in a concentration of at least 2M. In some embodiments, the anolyte is present in a concentration of at least 3M.

As used herein, the concentration of the anolyte includes the sum total moles of active species present in a given volume of the electrolyte in the dissolved and colloidal states.

In some embodiments, the catholyte is present in a relatively high concentration. In some embodiments, the catholyte is present in a concentration of at least 0.3M. In some embodiments, the catholyte is present in a concentration of at least 0.4M. In some embodiments, the catholyte is present in a concentration of at least 0.5M. In some embodiments, the catholyte is present in a concentration of at least 0.6M. In some embodiments, the catholyte is present in a concentration of at least 0.7M. In some embodiments, the catholyte is present in a concentration of at least 0.8M. In some embodiments, the catholyte is present in a concentration of at least 0.9M. In some embodiments, the catholyte is present in a concentration of at least 1M. In some embodiments, the catholyte is present in a concentration of at least 1.1M. In some embodiments, the catholyte is present in a concentration of at least 1.5M. In some embodiments, the catholyte is present in a concentration of at least 2M. In some embodiments, the catholyte is present in a concentration of at least 3M.

As used herein, the concentration of the catholyte includes the sum total moles of active species present in a given volume of the electrolyte in the dissolved and colloidal states.

As used herein, lanthanides include lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu).

In some embodiments, the lanthanide ion is selected from the group consisting of La, Ce, Pr, Nd, Pm, Sm, Eu, Gd, Tb, Dy, Ho, Er, Tm, Yb, Lu, and combinations thereof. In some embodiments, the lanthanide ion is Ce.

As used herein, transition metals include scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), and mercury (Hg).

In some embodiments, the transition metal ion is selected from the group consisting of Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, Hg, and combinations thereof. In some embodiments, the transition metal ion is selected from the group consisting of Ti, V, and combinations thereof.

In some embodiments, the cathode is any suitable cathode known in the art. In some embodiments, the cathode is a carbon felt electrode.

In some embodiments, the anode is any suitable anode known in the art. In some embodiments, the anode is a carbon felt electrode.

In some embodiments, the permselective ion exchange membrane is selected from the group consisting of an anion exchange membrane and a proton exchange membrane.

In some embodiments, the permselective ion exchange membrane is characterized by the relative permeabilities of a cation and a counter anion. The flow cell battery exhibits improved performance when crossover of the cation is minimized but the counter anions freely cross over.

In some embodiments, the cation is selected from the group consisting of transition metal ions, lanthanide ions, and combinations thereof.

In some embodiments, the permselective ion exchange membrane is selected from the group consisting of membranes comprising block copolymers, SEBS membranes, QPEK membranes, and combinations thereof.

In some embodiments, the permselective ion exchange membrane is a permselective ion exchange membrane known in the art. Suitable permselective ion exchange membranes are disclosed in US 20190044158 and WO 2020028374, which are hereby incorporated by reference in their entirety.

Further described herein is a reinforced anion exchange membrane comprising a block co-polymer and a hydrophobic reinforcement matrix.

In some embodiments, the block co-polymer is chloromethylated.

In some embodiments, the block co-polymer is functionalized with a functionalizing cation.

In some embodiments, the block co-polymer is a triblock co-polymer. In some embodiments, the triblock co-polymer comprises polystyrene-block-poly(ethylene-ran-butylene)-block-polystyrene (SEBS). In some embodiments, the SEBS triblock co-polymer is chloromethylated and functionalized with trimethylamine.

In some embodiments, the hydrophobic reinforcement matrix comprises porous extended polytetrafluoroethylene (e-PTFE).

Yet further described herein is a redox flow battery comprising a reinforced anion exchange membrane separating a cathode and a catholyte from an anode and an anolyte.

In some embodiments, the capacity fade is substantially small. In some embodiments, the capacity fade over 100 charge-discharge cycles is less than 1%. In some embodiments, the capacity fade over 100 charge-discharge cycles is less than 0.5%. In some embodiments, the capacity fade over 100 charge-discharge cycles is less than 0.1%. In some embodiments, the capacity fade over 100 charge-discharge cycles is less than 0.05%. In some embodiments, the capacity fade over 100 charge-discharge cycles is less than 0.03%.

In some embodiments, the capacity fade over 100 charge-discharge cycles is less than 0.1%.

Also described herein is a method of using a redox flow battery, wherein the redox flow battery comprises a cathode; a catholyte comprising a transition metal ion and a supporting electrolyte, wherein the transition metal ion and the supporting electrolyte form a first solvation structure; an anode; an anolyte comprising a lanthanide ion and a supporting electrolyte, wherein the lanthanide ion and the supporting electrolyte form a second solvation structure; and a permselective ion exchange membrane separating the cathode and the catholyte from the anode and the anolyte, the method comprising using the redox flow battery to store energy.

Additionally described herein is a method of using a redox flow battery, wherein the redox flow battery comprises a reinforced anion exchange separating a cathode and a catholyte from an anode and an anolyte, the method comprising using the redox flow battery to store energy.

In some embodiments, energy is stored from a continuous power source, and intermittent power source, and combinations thereof.

In some embodiments, the continuous power source is selected from the group consisting of coal combustion, hydrocarbon combustion, nuclear power, hydroelectric power, geothermal power, and combinations thereof.

In some embodiments, the intermittent power source is selected from the group consisting of solar power, wind power, ocean wave power, tidal power, salinity gradient power, and combinations thereof.

Methanesulfonic Acid-based Electrode-decoupled Vanadium-Cerium Redox Flow Battery Exhibits Significantly Improved Capacity and Cycle Life The present application describes the use of methanesulfonic acid supported Ce and V electrolytes separated by an AEM that enables true electrode decoupled RFB operation. One key innovation of using the highly selective polystyrene-block-poly(ethylene-ran-butylene)-block-polystyrene (SEBS) triblock copolymer separators and the bulkier nature of the methanesulfonate coordinated ions ensured minimal cross-over and enabled demonstration of minimal capacity fade over 100 charge-discharge cycles (0.024% capacity fade per cycle). The membranes are chemically stable in both the V and Ce ions and the methanesulfonic acid. The use of methanesulfonic acid as the supporting electrolyte, balancing the inverse relationship between $Ce^{3+}$ and $Ce^{4+}$ solubilities with increasing $CH_3SO_3H$ concentrations, enabled electrolyte concentrations of up to 1M at room temperature. Having limited the concentration to 0.9 M to prevent precipitation due to local concentration variations, a V—Ce electrode-decoupled (ED-) RFB was demonstrated with 30% higher practical capacity than previous reports. Methanesulfonic acid confers the added benefit of using a "green" chemical with low relative toxicity and ease of disposal. Thus, a novel, high-performance ED-RFB has been developed, as described herein.

EXAMPLES

Synthesis and characterization of anion exchange separators. The polystyrene-block-poly(ethylene-ran-butylene)-block-polystyrene (SEBS) triblock copolymer separators with 30% wt. of styrene were synthesized and characterized according to known methods. The AEMs were initially prepared in the chloride form and then ion exchanged by immersion in 0.1M $H_2SO_4$ or 0.1M $CH_3SO_3H$ to produce the sulfate or methanesulfonate forms, respectively. The stability of the AEMs was characterized by immersing them in 4 M $CH_3SO_3H$ at 40° C. for 5 weeks and periodically measuring the change (if any) in ionic conductivity and ion exchange capacity (IEC). Cross-sectional scanning electron microscopy (SEM) of the membrane was carried out using a FEI Nova NanoSEM 230 scanning electron microscope (SEM) with an attached energy dispersive analysis of X-rays (EDAX) detector. The Fourier transform infrared (FT-IR) spectra of the membrane was obtained using a Thermo-Fisher Nicolet instrument to detect any evidence of membrane degradation.

Synthesis and characterization of ED-RFB electrolytes. The electrolytes used herein consist of 0.9 M $VOSO_4$ in 5.8 M $CH_3SO_3H$ and 0.9 M $Ce(CH_3SO_3)_3$ in 4 M $CH_3SO_3H$. $VOSO_4$ (97%, Sigma-Aldrich) was readily soluble in water and $CH_3SO_3H$ (99%, Acros Organics) to yield the desired electrolyte. The $Ce(CH_3SO_3)_3$ was made by the reaction between $CH_3SO_3H$ and $Ce_2(CO_3)_3$ (99%, Treibacher Industrie A.G.):

$$Ce_2(CO_3)_3 + 6CH_3SO_3H \rightarrow 2Ce(CH_3SO_3)_3 + 3CO_2 + 3H_2O$$

The $Ce_2(CO_3)_3$ was suspended in DI water and $CH_3SO_3H$ was added dropwise with constant stirring. Due to the sensitivity of $Ce(CH_3SO_3)3$ solubility to the $CH_3SO_3H$ concentration, the reaction mixture was diluted periodically with DI water to prevent precipitation of $Ce(CH_3SO_3)_3$. The $VOSO_4$ electrolyte was converted to its $V^{3+}$ form using a symmetric V/V cell before testing the V—Ce ED-RFB.

The electrolytes were electrochemically characterized using cyclic voltammetry. The electrochemical measurements were carried out in a small-volume electrochemical cell (Pine Instruments, RRPG223) with a 3 mm diameter glassy carbon (GC) disc working electrode, a counter electrode consisting of a Pt mesh attached to a Pt wire and an Ag/AgCl reference electrode (0.197 V vs. SHE). All potentials are reported on the standard hydrogen electrode (SHE) scale unless otherwise noted. The electrochemical measurements were performed using a Solartron multichannel potentiostat.

ED-RFB tests. ED-RFB testing was carried out using a Scribner Inc. 857 RFB test stand. The cell used was of the standard plate-and-frame configuration with a 25 cm² active area. The electrodes employed were made of carbon felt (SigraCELL GFA6, SGL carbon) which were activated by heating in air in a muffle furnace at 400° C. All tests were carried out using interdigitated flow fields at a flow rate of 100 mL.min$^{-1}$ and at 25° C. The polarization measurements were carried out by potentiostatic charging of the ED-RFB to the voltage corresponding to the desired state of charge (SOC) and then employing a current stair-step protocol with a hold time of 30 s to allow for equilibration after each step increase. After each 30 second hold, an equal and opposite current was applied so as to prevent any change in the initial SOC. The charge-discharge cycling was carried out galvanostatically between 2 V and 0.65 V at four different current densities: 25 mA.cm$^{-2}$, 50 mA.cm$^{-2}$, 75 mA.cm$^{-2}$, and 100 mA.cm$^{-2}$. The various efficiencies of the ED-RFB were calculated using the following relationships:

$$\text{Coulombic efficiency}(CE) = \frac{\text{volumetric discharge capacity}(Ah \cdot L^{-1})}{\text{volumetric charge capacity}(Ah \cdot L^{-1})} \times 100 \quad \text{(Equation 4)}$$

$$\text{Energy efficiency}(EE) = \frac{\text{energy discharged}(Wh \cdot L^{-1})}{\text{energy supplied upon charging}(Wh \cdot L^{-1})} \times 100 \quad \text{(Equation 5)}$$

The cation cross-over across the AEM separator following ED-RFB cycling was measured using a PerkinElmer Optima 7300DV inductive-coupled plasma optical emission spectrometer (ICP-OES).

Results and Discussion

The chloromethylated-SEBS-30 functionalized with trimethylamine (here after referred to as CM-SEBS-30-TMA) AEMs were successfully prepared as described in the art. The properties of these membranes are provided in Table 1.

TABLE 1

| Summary of CM-SEBS-30-TMA properties. | |
|---|---|
| Property | SEBS30-TMA |
| Experimental IEC (mmol/g) | 1.35 ± 0.02 |
| Chloride conductivity (@ 70° C., mS/cm) | 18 ± 3 |
| Ultimate tensile stress (MPa) | 3.1 ± 0.6 |
| Elongation at break (%) | 536 ± 7 |
| Water uptake (%) | 52.0 |
| Swelling ratio (%) | 56.9 |
| Acid uptake (%) | 32.3 |
| Transport numbers ($t_{Cl-}$; $t_{K+}$) | (0.87 ± 0.02:0.13 ± 0.02) |

Figure 2:
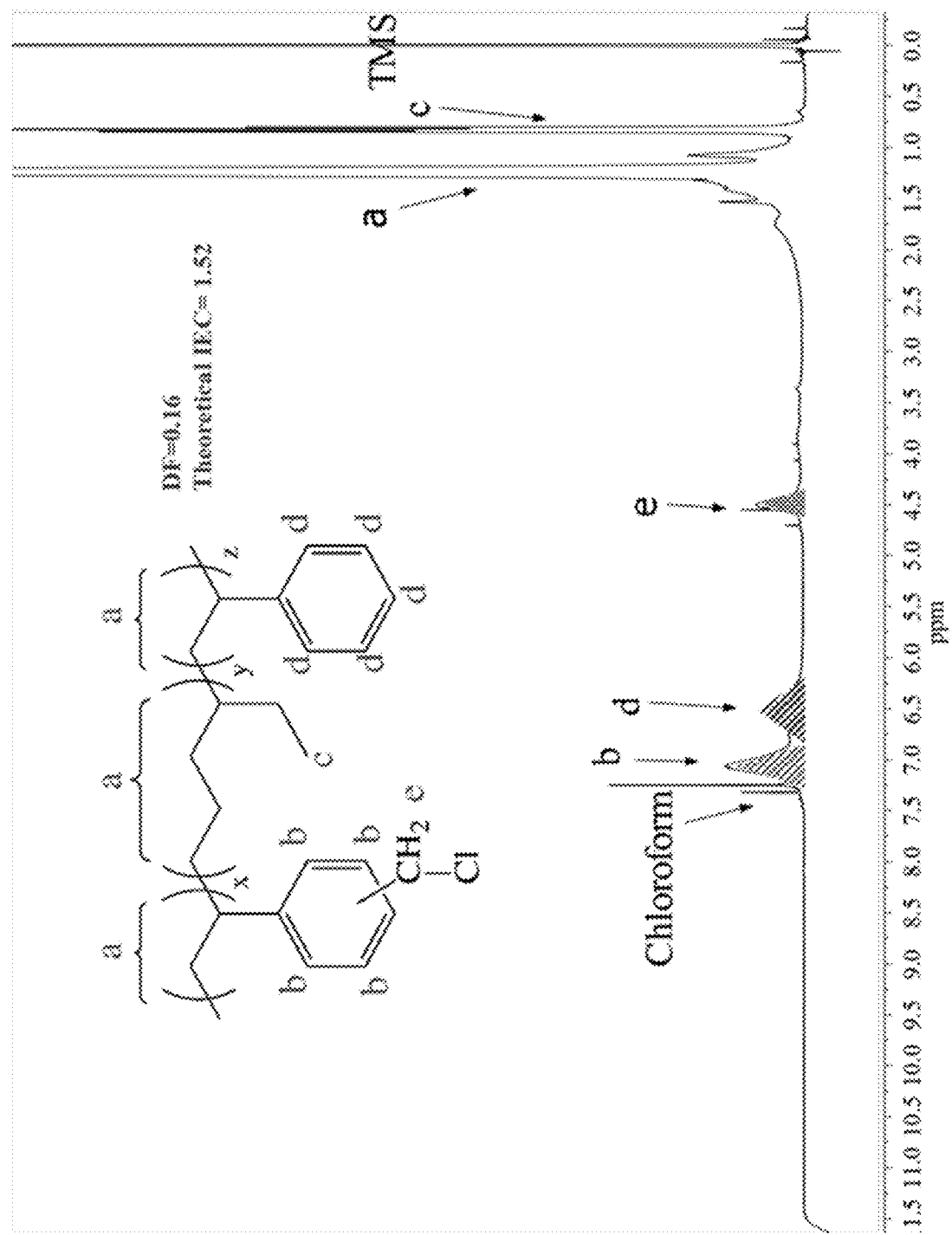
FIG. 2 is an exemplary embodiment of a $^1$H NMR spectrum of CM-SEBS30 in accordance with the present disclosure. Peaks a and c are protons in the aliphatic backbone and Peaks b and d are protons in the aromatic ring. The new peak e demonstrates the occurrence of the chloromethylation reaction.

Following the chloromethylation reaction, a degree of functionalization of 0.16 was achieved against a possible theoretical maximum of 0.3 (with all the styrene groups functionalized) as seen from the $^1H$ NMR in FIG. 2. The $^1H$ NMR experiment was performed in chloroform-d with trimethyl silane (TMS) internal standard for calibrating the chemical shift of $^1H$. The degree of functionalization (DF) of CM-SEBS30 was calculated from FIG. 2 by using the following equation:

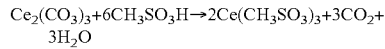

$$\frac{\frac{\text{Area}(e)}{2}}{\text{Area}(b) + \frac{\text{Area}(e)}{2}} \times 0.3 \quad \text{(Equation 6)}$$

Figure 3A:
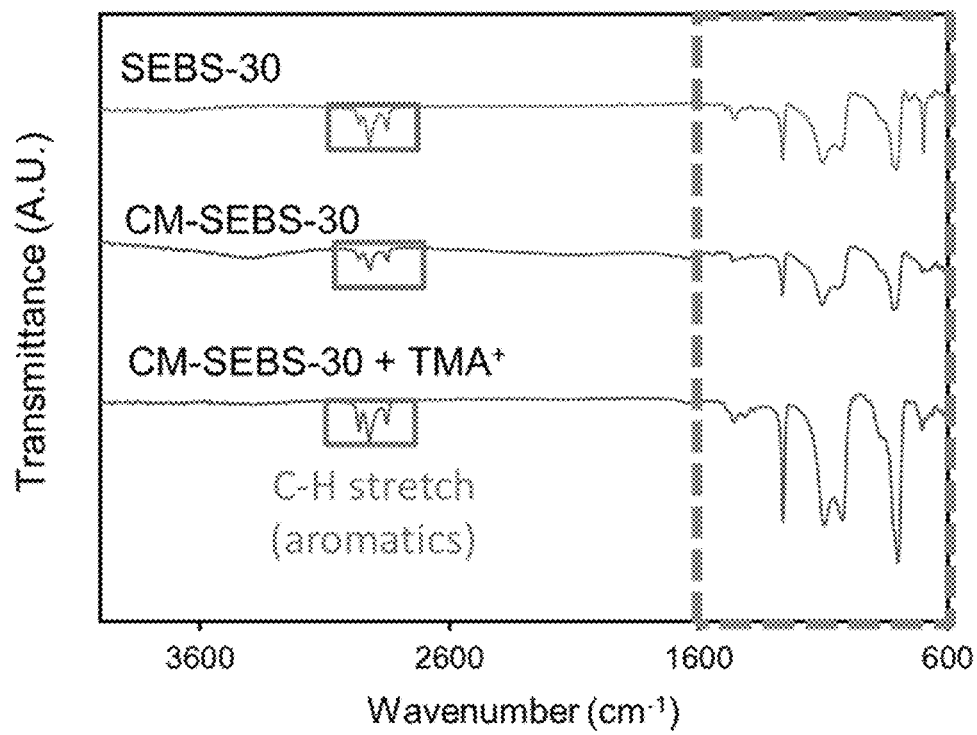
FIG. 3A is an exemplary embodiment of full FTIR-ATR spectra of the SEBS-30, CM-SEBS-30, and CM-SEBS-30-TMA in accordance with the present disclosure.
Figure 3B:
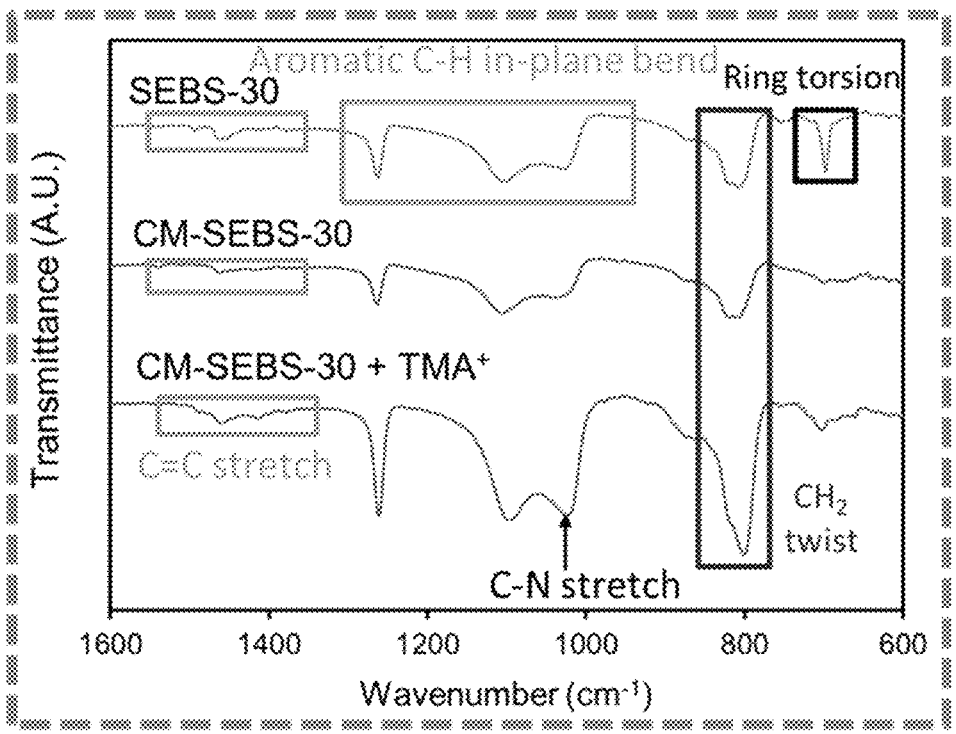
FIG. 3B is an exemplary embodiment of partial FTIR-ATR spectra of the SEBS-30, CM-SEBS-30, and CM-SEBS-30-TMA in accordance with the present disclosure.
Figure 4B:
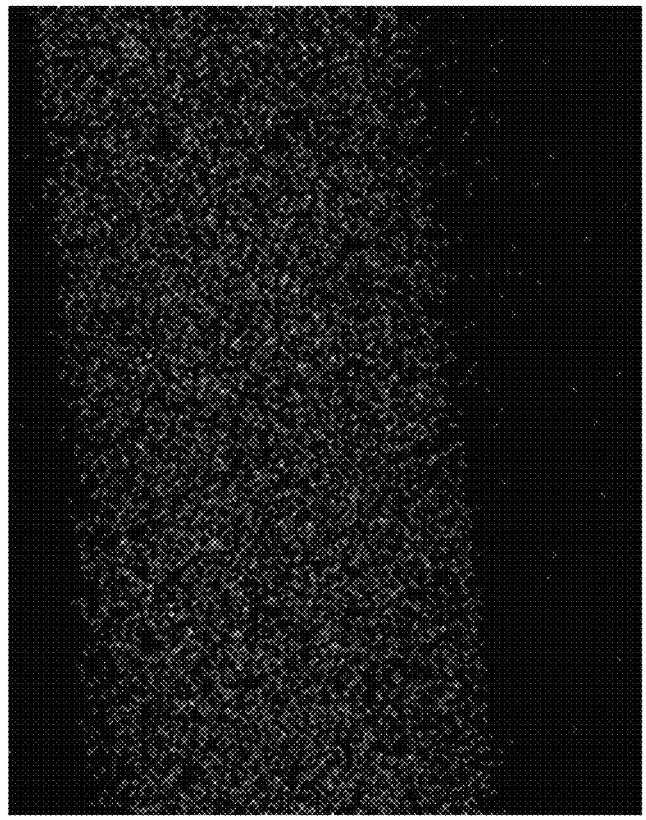
FIG. 4B is an exemplary embodiment of chlorine EDAX mapping spectra of the cross-section of a CM-SEBS-30-TMA AEM separator in accordance with the present disclosure.
Figure 4A:
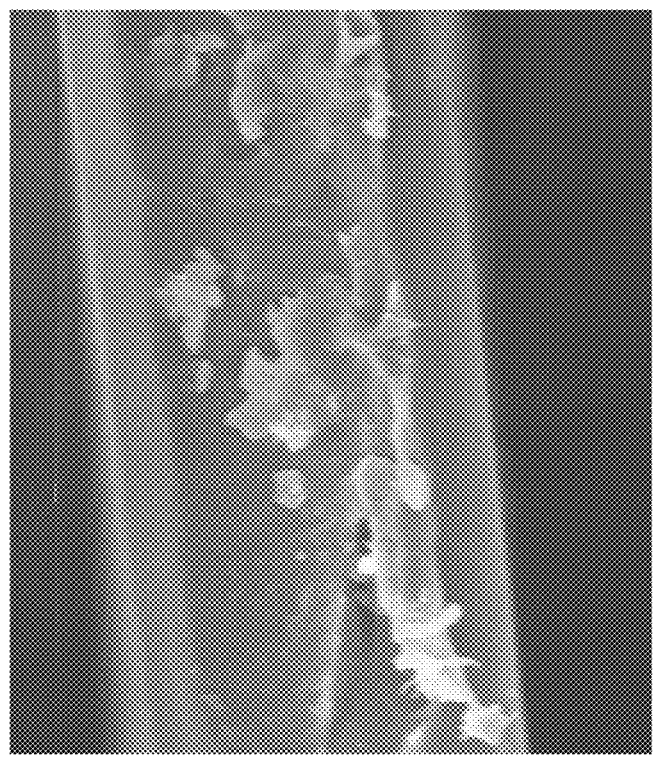
FIG. 4A is an exemplary embodiment of an SEM image of the cross-section of a CM-SEBS-30-TMA AEM separator in accordance with the present disclosure.
Figure 5A:
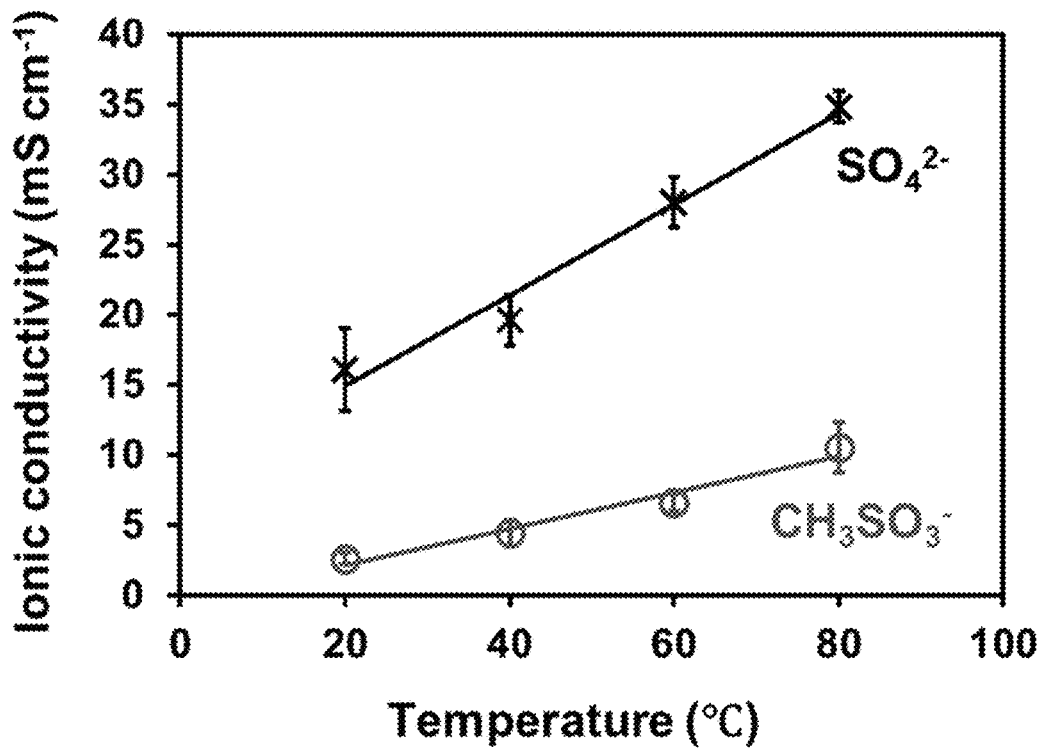
FIG. 5A is an exemplary embodiment of the temperature dependence of the sulphate and methanesulfonate ionic conductivity of CM-SEBS-30-TMA separators in accordance with the present disclosure.
Figure 5B:
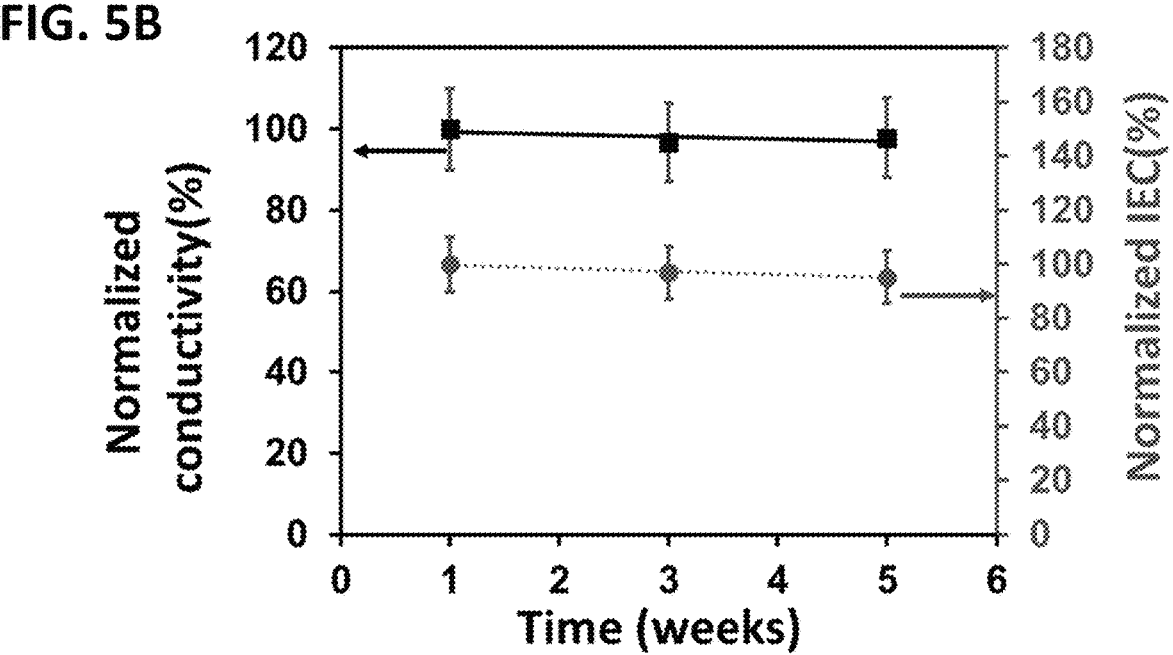
FIG. 5B is an exemplary embodiment of representative SEBS separator stability in methanesulfonic acid at 40° C. in accordance with the present disclosure.
Figure 6:
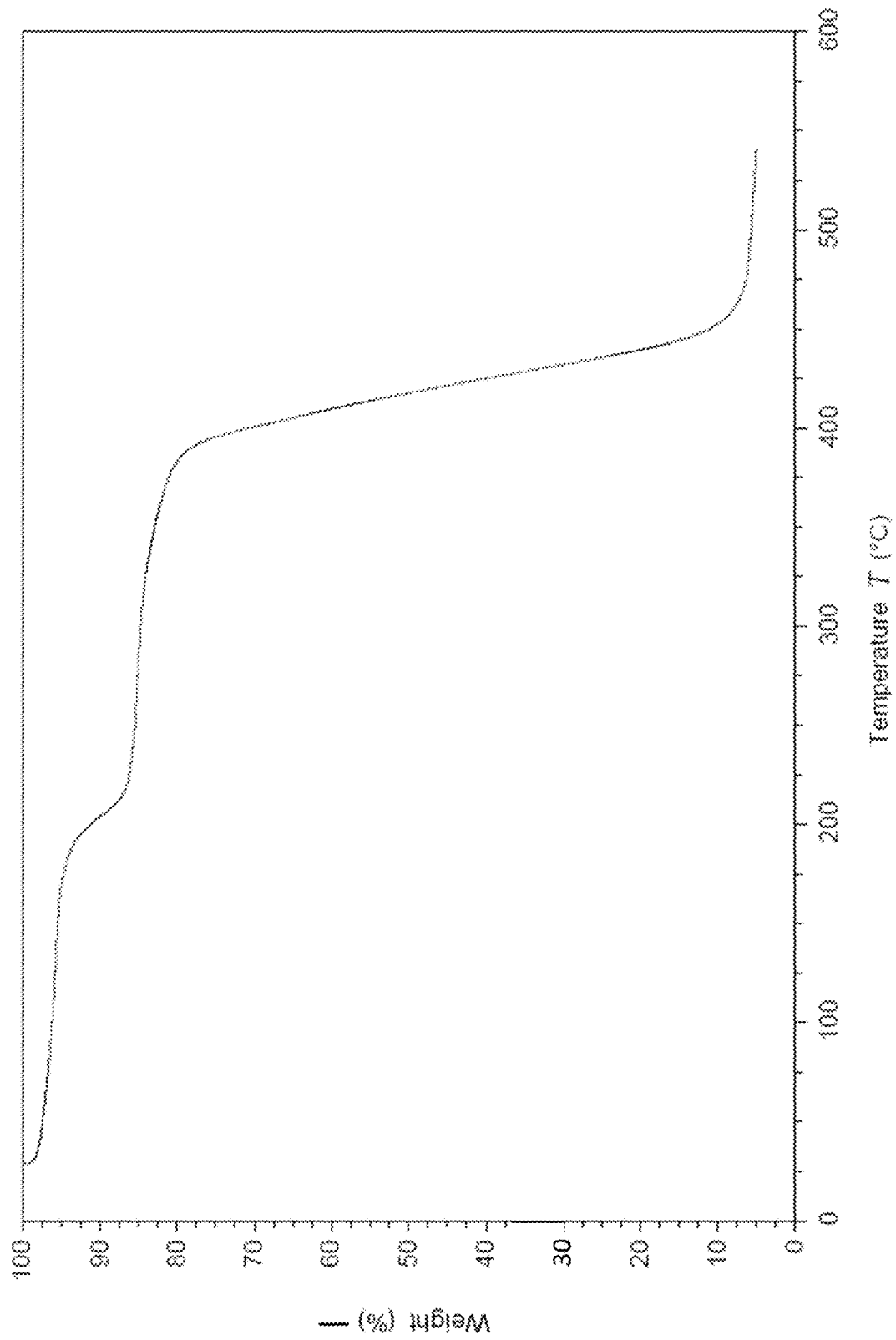
FIG. 6 is an exemplary embodiment of a thermogravimetric analysis of a CM-SEBS-30-TMA AEM separator in accordance with the present disclosure.

Upon addition of the trimethylamine cation, the ion exchange capacity was 1.35±0.02 (~90% of theoretical). The addition of TMA was confirmed by the C—N stretch in the FTIR spectra of CM-SEBS-30-TMA which was absent in spectra of CM-SEBS-30 prior to TMA addition (FTIR spectra depicted in FIGS. 3A-3B). The uniform addition of TMA across the membrane was confirmed by EDAX spectral mapping obtained across the cross-section of the membrane, which showed the presence of the Cl$^-$ counterion to TMA$^+$ and is depicted in FIGS. 4A-4B. The ionic conductivity of the AEM was measured using a standard 4-electrode cell. The AEM was ion exchanged to the sulfate and methanesulfonate form by immersion in 0.1 M $H_2SO_4$ and 0.1 M $CH_3SO_3H$ respectively for 24 hours. The sulfate ion conductivity values (depicted in FIG. 5A) were found to be higher than the values for the methanesulfonate anion due to the relatively smaller hydrodynamic radius of the sulfate anion. The result of the AEM stability test is depicted in FIG. 5B. The CM-SEBS-30-TMA AEM was found to stable over the course of this test and exhibited minimal changes in ionic conductivity and IEC. The AEM separator was found to be both thermally and mechanically robust with thermal degradation starting at over 200° C. (FIG. 6), while the ultimate tensile strength was found to be 3.1±0.6 MPa.

TABLE 2

Voltammetric properties of the $V^{2+}/V^{3+}$ and $Ce^{3+}/Ce^{4+}$ redox couples and heterogenous charge transfer parameters calculated from the same. The locations of $E_c$, $E_a$ and $E_{form}$ are indicated in FIG. 7A while the calculation of the other properties are described in text.

|  | $V^{2+}/V^{3+}$ redox couple | $Ce^{3+}/Ce^{4+}$ redox couple |
|---|---|---|
| $E_c$ (V) | −1.25 | 1.24 |
| $E_{c/2}$ (V) | −1.06 | 1.41 |
| $E_a$ (V) | 0.18 | 1.88 |
| $E_{a/2}$ (V) | −0.14 | 1.69 |
| $E_{form}$ (V) | −0.53 | 1.56 |
| $\Delta E_p$ (V) | 1.43 | 0.64 |
| $\alpha$ | 0.2 ($V^{3+} + e^- \rightarrow V^{2+}$) | 0.3 ($Ce^{3+} \rightarrow Ce^{4+} + e^-$) |
| $|\lambda|$ (kJ · mol$^{-1}$) | 51000 | 150000 |
| $|\lambda/F|$ (V) | 0.53 | 1.54 |

Figure 7A:
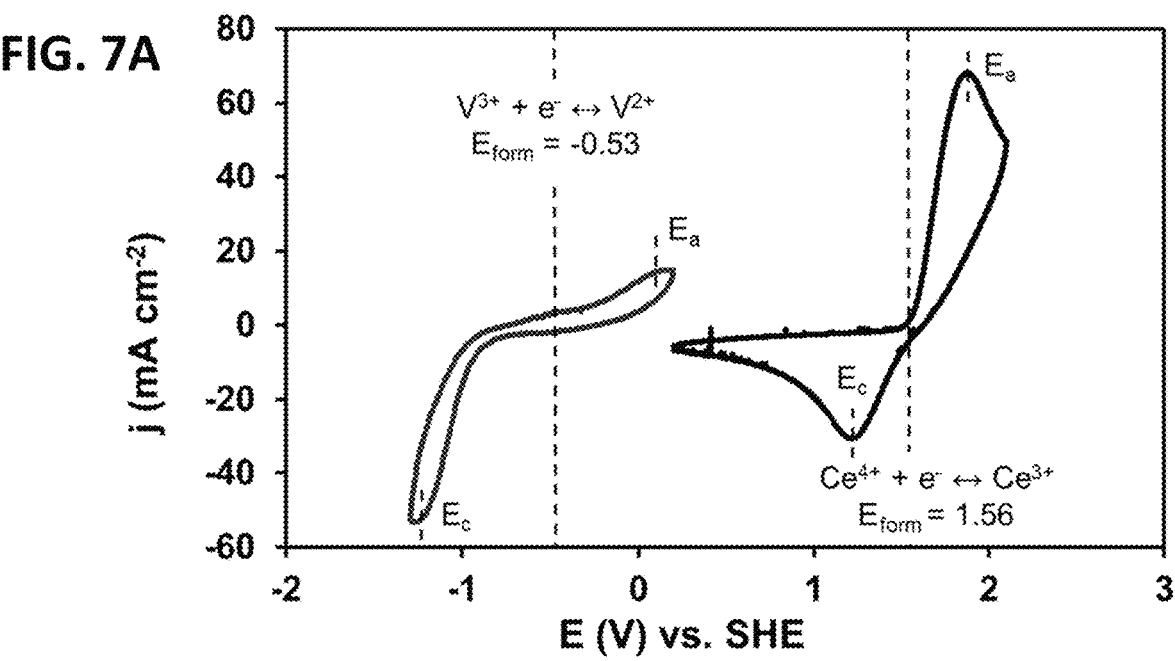
FIG. 7A is an exemplary embodiment of cyclic voltammograms of the $V^{3+}/V^{2+}$ and $Ce^{4+}/Ce^{3+}$ redox couples in methanesulfonic acid in accordance with the present disclosure (W.E: 0.07 cm$^2$ GC disk, C.E: Pt mesh, R.E: Ag/AgCl (0.197 V vs. SHE), scan rate: 500 mV.s$^{-1}$).
Figure 7B:
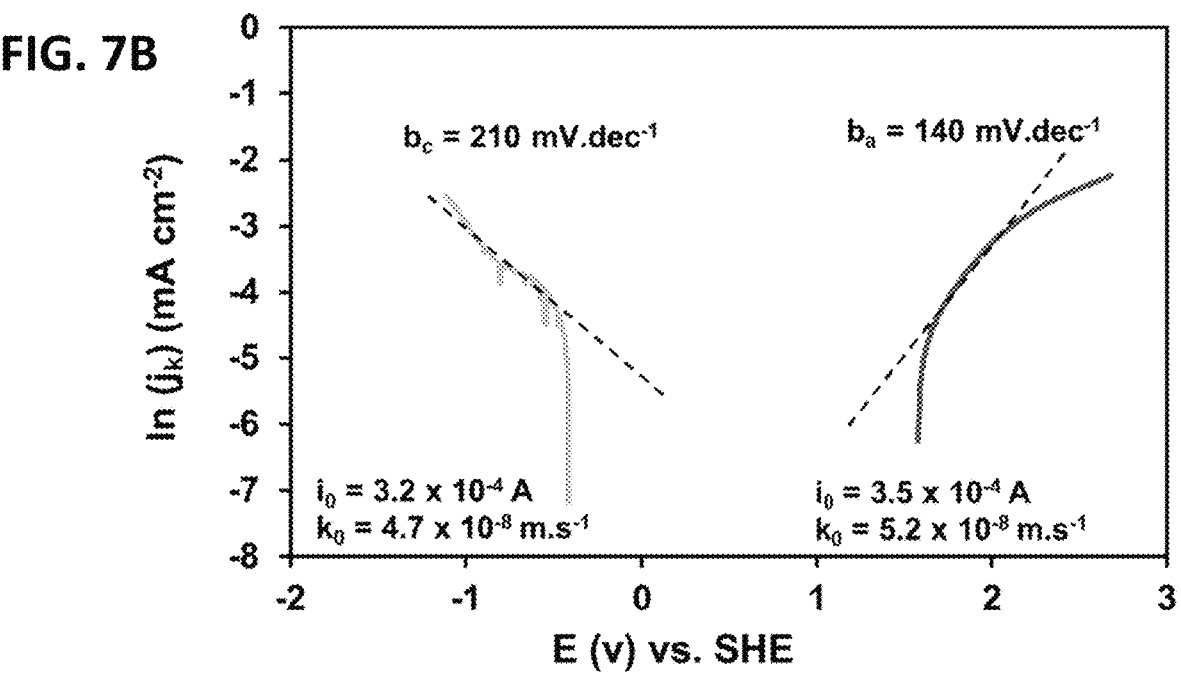
FIG. 7B is an exemplary embodiment of Tafel plots of the charging reactions of the V—Ce ED-RFB in accordance with the present disclosure.

The electrolytes used herein were initially characterized using cyclic voltammetry as depicted in FIGS. 7A-7B. The voltammetric properties are summarized in Table 2. Given that the electrolytes consisted of the cations of interest in one oxidation state at the onset, cations that are formed in the other oxidation state rapidly diffuse into the bulk of the electrolyte due to the sharp concentration gradient. Thus, the CVs were recorded at a high scan rate to reduce (or oxidize) the produced redox species before it diffused away from the near electrode environment.

The cathodic peaks was the lowest current density value during the negative going (cathodic) scan and the corresponding potential was recorded as the cathodic peak potential ($E_c$). Similarly, the anodic peak was the highest current density value during the positive going (anodic) scan and the corresponding potential was recorded as the anodic peak potential ($E_a$). The difference between $E_c$ and $E_a$ was the peak separation ($\Delta E_p$). The peak separation ($\Delta E_p$) for the $V^{2+}/V^{3+}$ redox couple was found to be 1.43 V while the peak separation for the $Ce^{3+}/Ce^{4+}$ redox couple was found to be 0.64V, which indicated irreversibility. The formal potential ($E_{form}$) values were calculated as $E_{form}=(E_c+E_a)/2$. Based on the formal potential, the cathodic and anodic half-wave potentials (i.e. potential where the anodic (or cathodic) current is one-half the peak value) $E_{c/2}$ and $E_{a/2}$ were calculated. $E_{form}$ showed significant deviation from the E° values (270 mV for the $V^{2+}/V^{3+}$ redox couple and 500 mV for the $Ce^{3+}/Ce^{4+}$ redox couple) indicating the strong effect of the $CH_3SO_3^-$ ion coordination with the redox species. $E_{form}$ cannot be directly correlated to $E_0$ as $E_0$ is an ideal value at equal concentrations of the reduced and oxidized species, without accounting for the effects of the supporting electrolyte. The comparison between the two is intended to highlight the solvating effect of the $CH_3SO_3^-$ anion. This effect is well known in the case of the $Ce^{3+}/Ce^{4+}$ redox couple and a similar mechanism appears to apply in case of the $V^{2+}/V^{3+}$ redox couple. A further consideration for the $V^{2+}/V^{3+}$ redox couple is that use of the $VOSO_4$ salt will ensure that the $V^{2+}/V^{3+}$ redox couple is coordinated with both $SO_4^{2-}$ and $CH_3SO_3H$ anions. Thus, the CV characteristics are a function of this coordination structure. The effect of the solvation structure on these redox couples was characterized by calculating the solvent reorganization energy ($\lambda$). $\lambda$ is the amount of energy required to rearrange the reactant solvation shell to its product form and plays a prominent role in the Marcus-Hush kinetic formulation for heterogenous electron transfer processes. $\lambda$ was calculated using the following equation:

$$\alpha = 0.5 + \frac{F}{4\lambda}(E - E^0 - \phi_r) \quad \text{(Equation 7)}$$

Here, $\alpha$ is the transfer coefficient, F is the Faraday's constant (96485 C/mol of $e^-$), $\phi_r$ is the potential at the plane of the reaction site vs. bulk solution and E° is the standard potential of the electrochemical reaction under consideration. The reactions were assumed to occur very close to the electrode surface and hence $\phi_r$ is approximately equal to E.

Since the electrolytes initially consist of $V^{3+}$ and $Ce^{3+}$ respectively, only the cathodic reaction of the $V^{2+}/V^{3+}$ redox couple and the anodic reaction of the $Ce^{3+}/Ce^{4+}$ redox couple were examined. This limitation is due to the local concentration of $V^{2+}$ and $Ce^{4+}$ being unknown and the scan rate dependence of the oxidation and reduction currents respectively of these two species (due to the outward diffusion of the products into the bulk electrolyte). The transfer coefficients (listed in Table 2) were calculated using the following equation:

$$\alpha = \frac{1.86RT}{F\left(E_P - E_{\frac{P}{2}}\right)} \quad \text{(Equation 8)}$$

where, R is the universal gas constant (8.314 J mol$^{-1}$K$^{-1}$), T is the temperature (298 K) and $E_p$ and $E_{P/2}$ are the peak and half-peak potentials respectively of the anodic or cathodic reaction. The $\alpha$ typically has a value of 0.5 which indicates that the anodic and cathodic reactions are equally facile and the occurrence of either is a function of the applied overpotential. The values of 0.2 for the $V^{3+}+e^-\rightarrow V^{2+}$ reaction and 0.3 for the $Ce^{3+}\rightarrow Ce^{4+}+e^-$ reaction indicated that forward and backward reactions are not equally facile, supporting the inference of an irreversible reaction from the >60 mV peak separation in the CVs.

Assuming the overall reactions for both couples are one-step and one-electron transfer, $\alpha_c+\alpha_a=1$, the transfer coefficient for the $V^{2+}\rightarrow V^{3+}+e^-$ reaction is 0.8, and the $Ce^{4+}+e^-\rightarrow Ce^{3+}$ reaction has a transfer coefficient of 0.7. FIG. 7B depicts the Tafel analysis carried out on the $V^{3+}+e^-\rightarrow V^{2+}$ and $Ce^{3+}\rightarrow Ce^{4+}+e^-$ reactions. The Tafel equation is as follows:

$$\eta = a + b \cdot \log(i_k) \quad \text{(Equation 9)}$$

where, $$a = \frac{2.3RT}{\alpha \cdot F} \cdot \log i_0 \quad \text{(Equation 10)}$$

$$b = -\frac{2.3RT}{\alpha \cdot F} \quad \text{(Equation 11)}$$

Here, $i_0$ is the exchange current density in mA cm$^{-2}$. The value of the Tafel slope for a one electron transfer reaction with $\alpha=0.5$ would be 118 mV dec$^{-1}$. In case of the reactions considered here, $\alpha_c=0.2$ would result in a cathodic Tafel slope of 295 mV dec$^{-1}$, while $\alpha_a=0.3$ would result in an anodic Tafel slope of 197 mV dec$^{-1}$ while the measured values were 210 mV dec$^{-1}$ and 140 mV dec$^{-1}$, respectively. The deviations were the result of experimental noise and the lack of an adequate linear region in the Tafel plots. The Tafel slopes and the measured $i_0$ for the Ce$^{3+}$/Ce$^{4+}$ redox couple were found to broadly agree with values known in the art.

Figure 8:
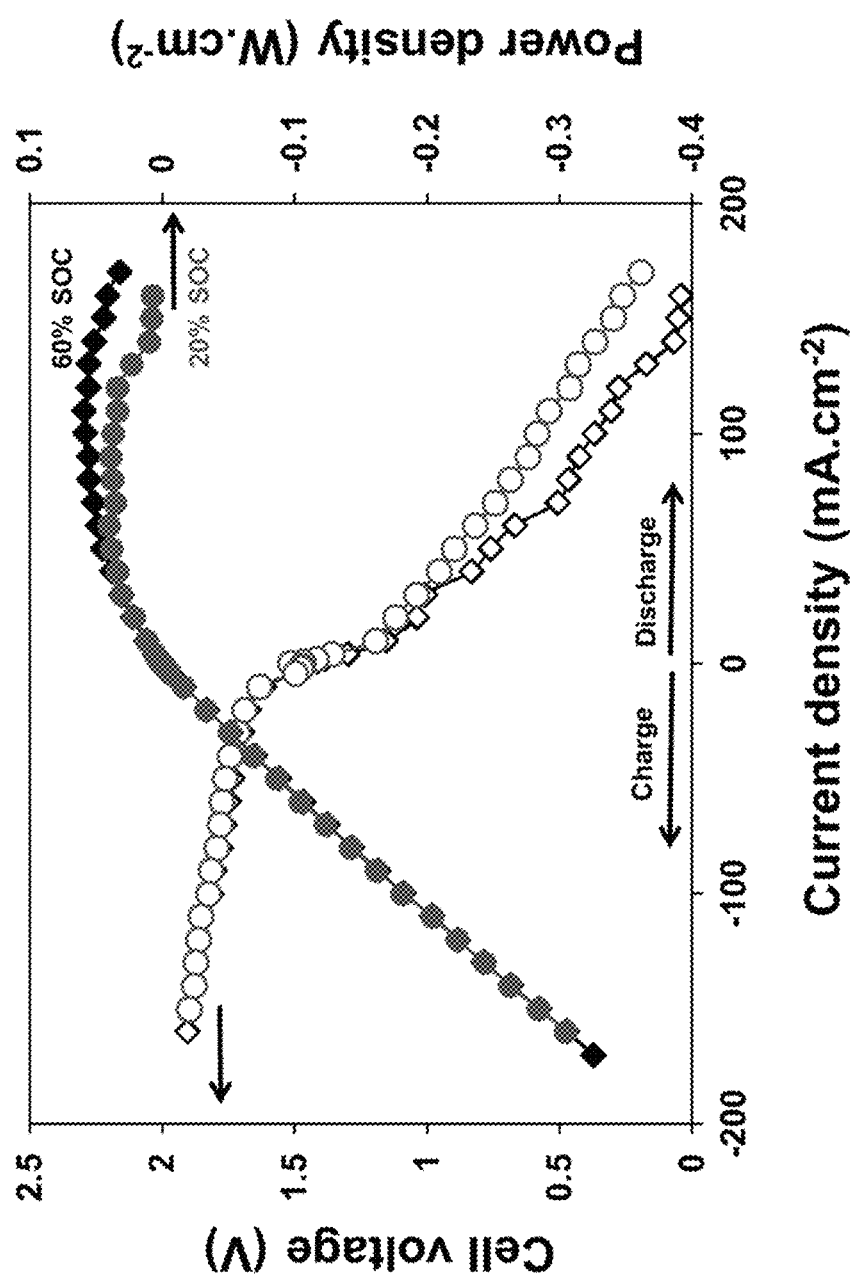
FIG. 8 is an exemplary embodiment of charge-discharge polarization curves of a V—Ce ED-RFB in accordance with the present disclosure at 20% and 60% SOC.

The polarization characteristics of the V—Ce ED-RFB measured at 20% and 60% SOC are depicted in FIG. 8. Before polarization measurements, the OCV was monitored at 0% SOC and found to be 1.337 V as compared to the 2.09 V difference in $E_{form}$ from the CVs and the theoretical value of 1.87 V. Substantial activation losses (at 10 mA.cm$^{-2}$) of 310 mV and 320 mV were observed at 20% and 60% SOC respectively during discharge while the charging activation losses were 152 mV and 116 mV respectively for 20% and 60% SOC. This was consistent with the irreversible nature of the CVs and the large reduction and oxidation overpotentials. The optimization of the carbon felt heat treatment process, the use of chemical treatments such as immersion in aqua regia or the use of catalysts could alleviate this issue. Distinct asymmetry was observed over the charge and discharge branches of the polarization curve with the average resistance during discharge being 0.54 Ω while the average charge resistance was 0.15 Ω. A part of this resistance is ohmic and the ex-situ membrane area specific resistance (ASR) of 0.51 Ω.cm$^2$ ($\sigma_{IP}$=11.69 mS.cm$^{-1}$ for a 60 μm thick membrane) suggested that these losses can be partially mitigated through improved membrane ionic conductivity. The ohmic losses would necessarily be symmetric and thus, the asymmetry was attributed to the highly irreversible nature of the half-cell reactions. The voltage profiles showed no mass-transport losses, indicating that the 100 mL.min$^{-1}$ flowrates employed was sufficient to prevent active species depletion near the electrode to a current of about 200 mA.cm$^{-2}$. The absence of mass-transport losses may also be attributed to the use of interdigitated flow fields, as they have been shown to substantially improve the flow distribution through and over the surface of the porous electrode.

FIG. 9A depicts the impact of separator and supporting electrolyte selection on ED-RFB performance. The use of Nafion® is impractical as it readily allows the mixing of the cations and hence does not allow an "electrode-decoupled" RFB architecture. The resultant capacity loss due to electrolyte mixing was apparent in the very first cycle and resulted in >40% capacity fade in 20 cycles at 50 mA.cm$^{-2}$ as demonstrated previously. The first cycle capacity difference between the other two RFBs utilizing the same CM-SEBS-30-TMA AEM separator was attributed to the increase in concentration achieved by using CH$_3$SO$_3$H as the supporting electrolyte. FIG. 9B depicts the impact of increasing current density on the achievable capacity in the CH$_3$SO$_3$H supported V—Ce ED-RFBs. The decline in available discharge capacity followed a typical direct correlation with the current density. The absolute values of achievable capacity can be improved by (in order of importance) improving the reversibility of the half-cell reactions, by the use of catalysts to lower activation losses, and by improving membrane conductivity.

Figure 10A:
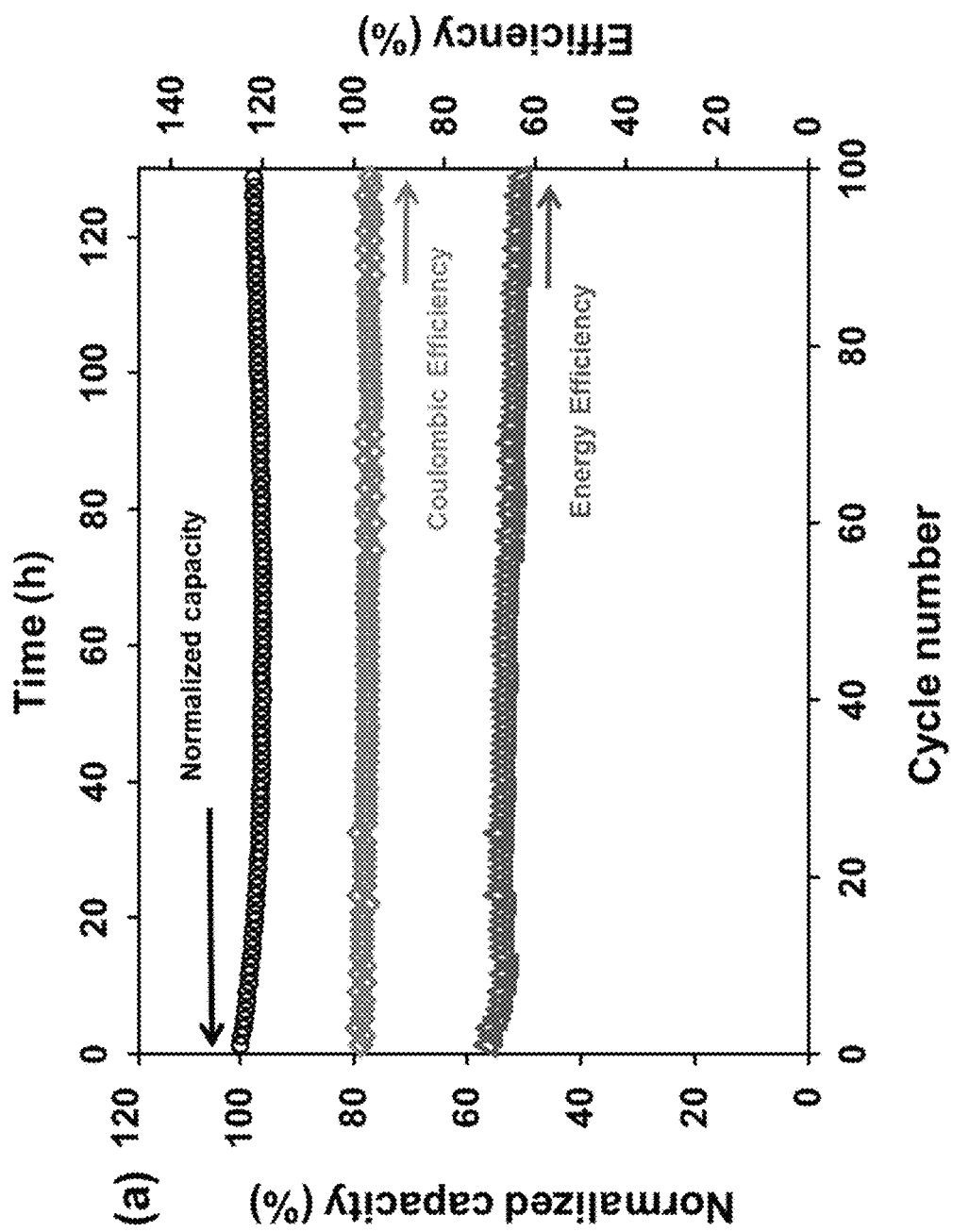
FIG. 10A is an exemplary embodiment of the performance of a CH$_3$SO$_3$H supported V—Ce ED-RFB in accordance with the present disclosure over 100 cycles at 50 mA.cm$^{-2}$.

FIG. 10A depicts the cycling performance of the ED-RFB over 100 cycles at 50 mA.cm$^{-2}$. A 2.4% loss of initial capacity was observed over the course of this test which was substantially better than the about 10% capacity loss observed over 20 cycles for ED-RFB systems utilizing the same AEM separator but with the H$_2$SO$_4$ based electrolytes. The membranes used herein are identical in terms of properties to membranes known in the art. Thus, the substantially improved capacity retention is a direct result of the CH$_3$SO$_3$H supporting electrolyte and the resultant changes in the cation solvation. Significantly, while the increase in cation concentration resulted in a sharper concentration gradient across the separator (and hence could increase cross-over), the increased hydrodynamic radius of the CH$_3$SO$_3^-$ anions compared to SO$_4^{2-}$ (as inferred from the ionic conductivity values) and the corresponding increase in the radii of the CH$_3$SO$_3^-$ solvated cations would also lead to a size exclusion effect that decreases cross-over. The improved capacity and capacity retention indicates that the solvation effect negates the increased concentration gradient. Assuming the capacity fade is caused only by the cation cross-over route and given that the redox processes are 1-electron transfer processes at both electrodes, it can be inferred that 2.4% (0.0216 moles) of the initial cation concentration on one side was transferred to the other.

Figure 10B:
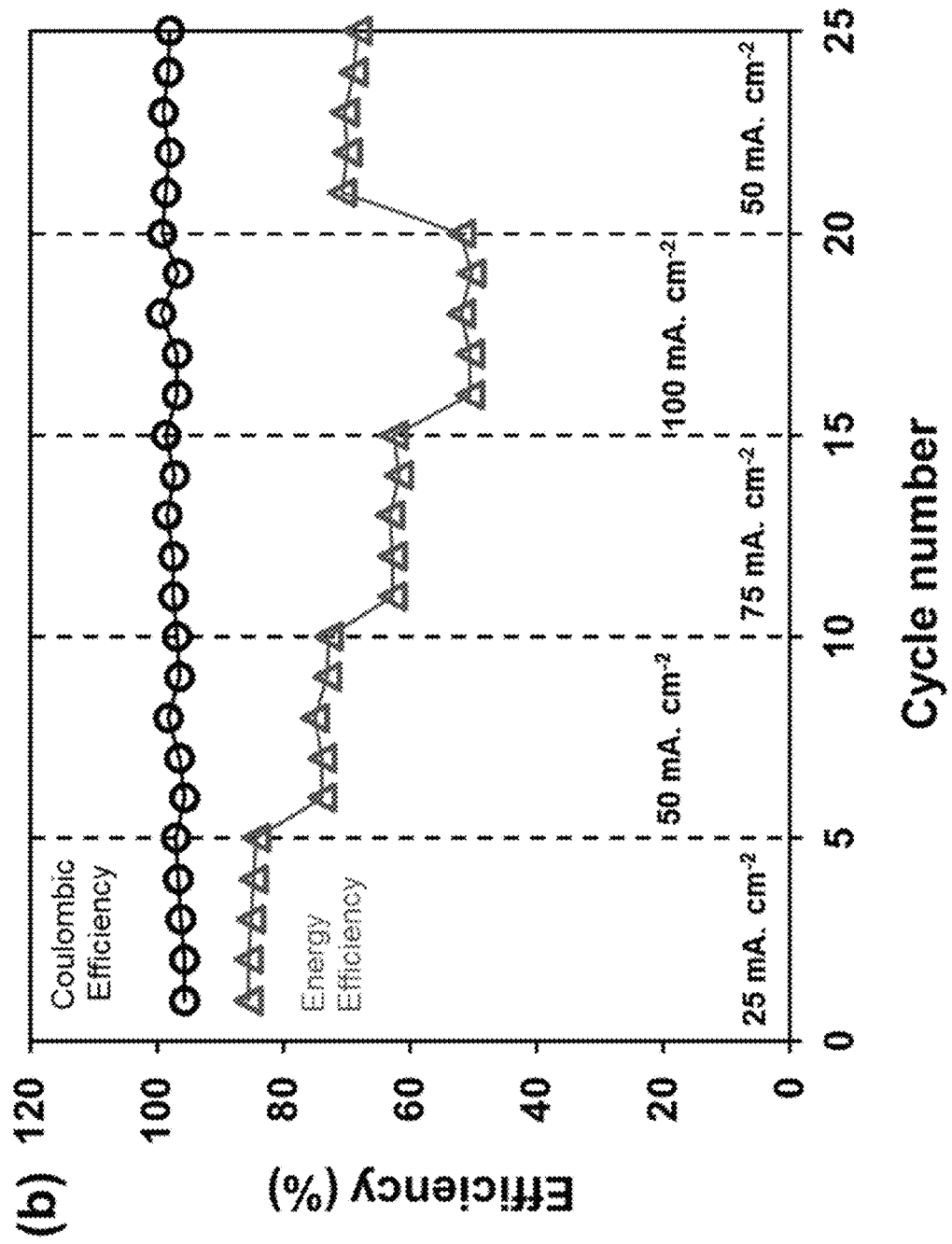
FIG. 10B is an exemplary embodiment of the performance of a CH$_3$SO$_3$H supported V—Ce ED-RFB in accordance with the present disclosure for a rate capability test at different current densities.

ICP-OES analysis of the electrolytes after cycling indicated that 0.017 moles of the cation has crossed-over, closely correlating with the capacity fade. These ED-RFBs also demonstrated an average EE of 65% over the course of the 100 cycles with a 6% decline over that period which was again a substantial improvement over the 12% loss over 20 cycles with the H$_2$SO$_4$ based V—Ce ED-RFB. FIG. 10B shows the impact of charge/discharge currents on the energy efficiency and coulombic efficiency of the ED-RFB. Even at 100 mA.cm$^{-2}$, EE of >50% was achieved. Further, even after relatively high current charge-discharge cycles, upon cycling again at 50 mA.cm$^{-2}$, the ED-RFB EE was found to return to the values initially recorded at 50 mA.cm$^{-2}$. This indicated that the cell was experiencing minimal side- or parasitic reactions.

Figure 10C:
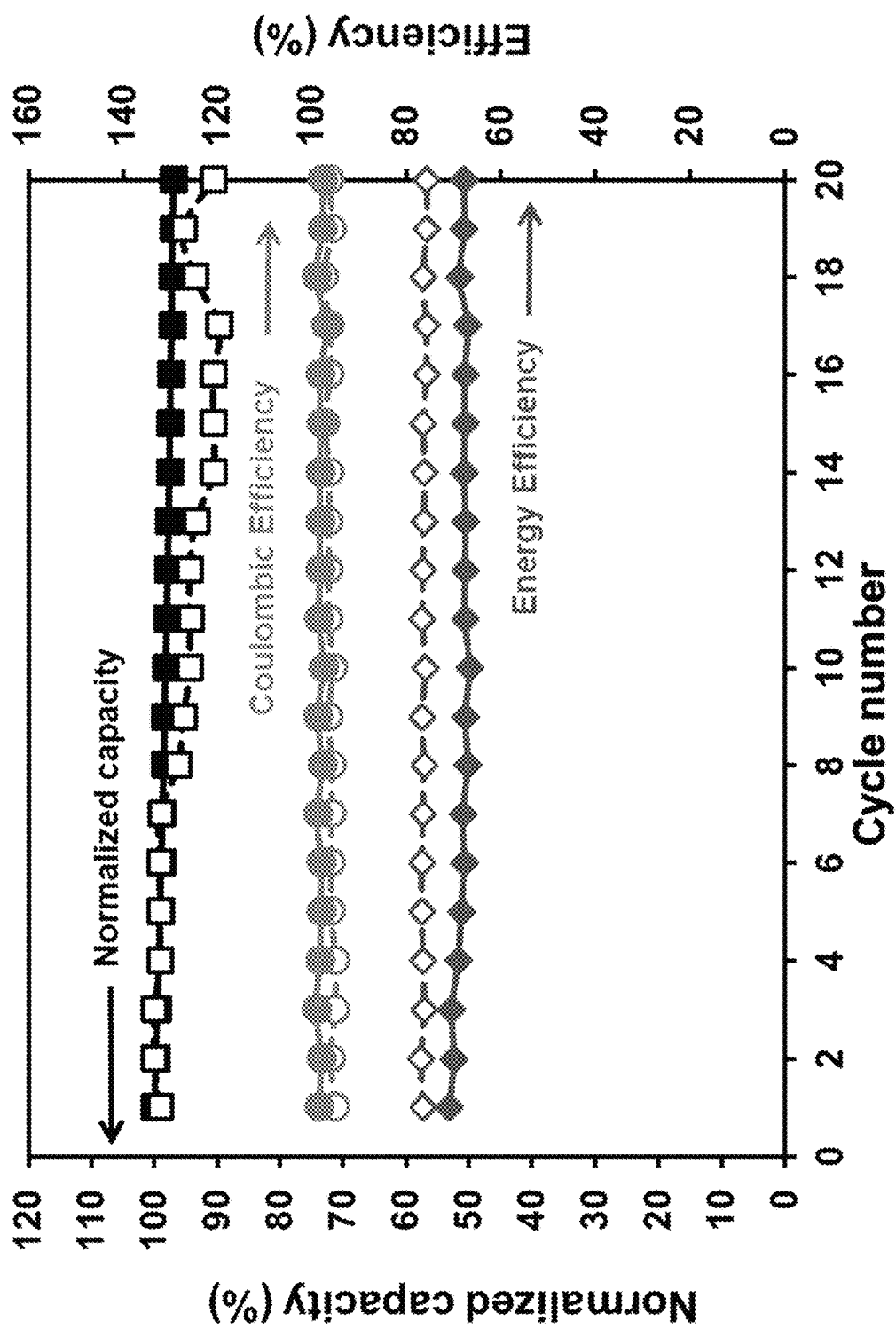
FIG. 10C is an exemplary embodiment of the performance of a CH$_3$SO$_3$H supported V—Ce ED-RFB with a QPEK-C-TMA separator (filled in symbols) or QPEK-C-TMA+Al$_2$O$_3$ separator (hollow symbols) supporting electrolyte in accordance with the present disclosure.

FIG. 10C shows a CH$_3$SO$_3$H supported V—Ce ED-RFB with a QPEK-C-TMA separator (a cardo-polyether ketone membrane) or QPEK-C-TMA+Al$_2$O$_3$ separator (a metal oxide doped cardo-polyether ketone membrane) supporting electrolyte. These results demonstrate that the advantages of electrolyte formulations in accordance with the present disclosure are broadly obtainable across a variety of AEM separators.

Figure 11:
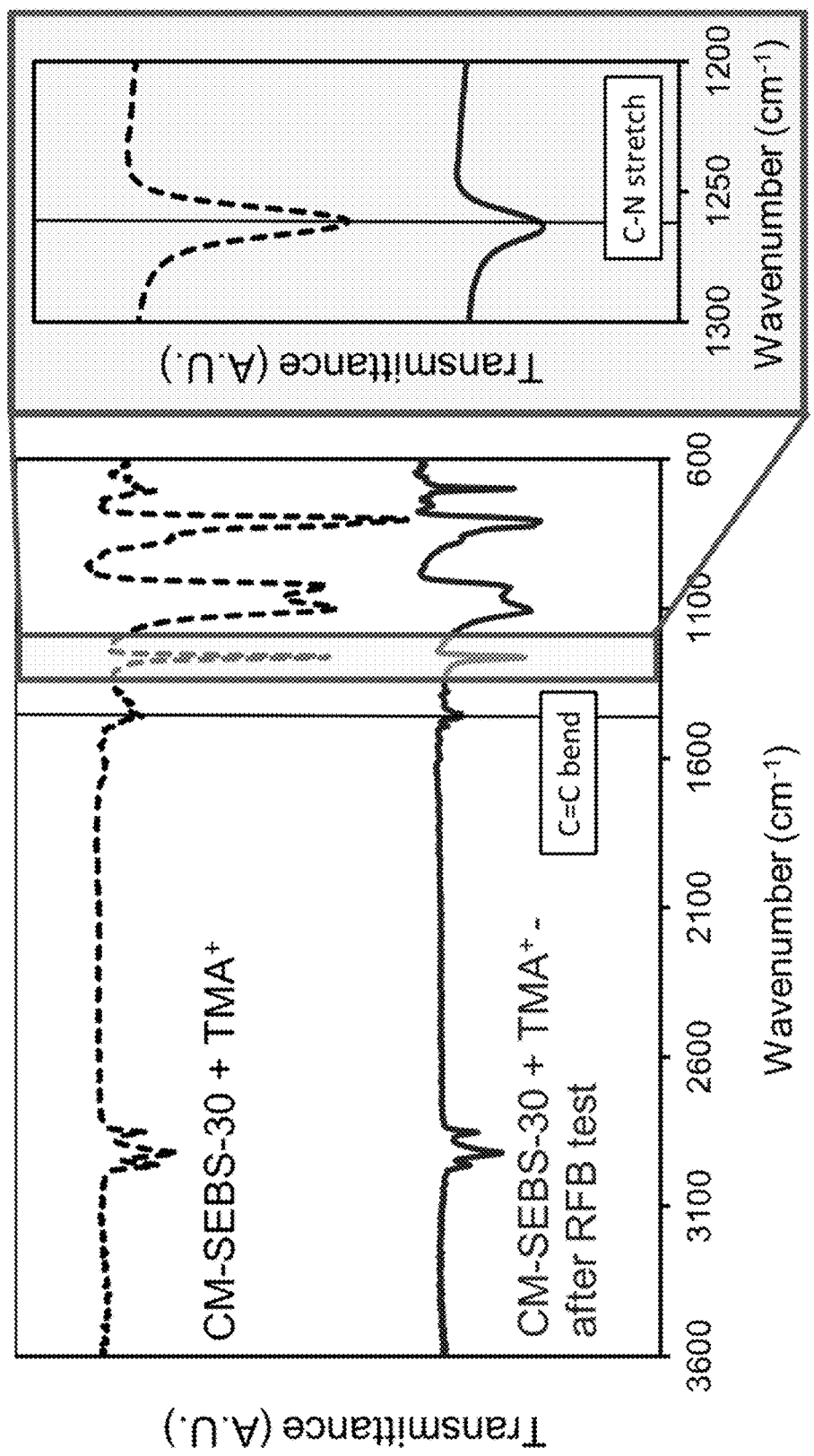
FIG. 11 is an exemplary embodiment of FT-IR spectra of a CM-SEBS-30-TMA ionomer in accordance with the present disclosure before and after an ED-RFB test.
Figure 12:
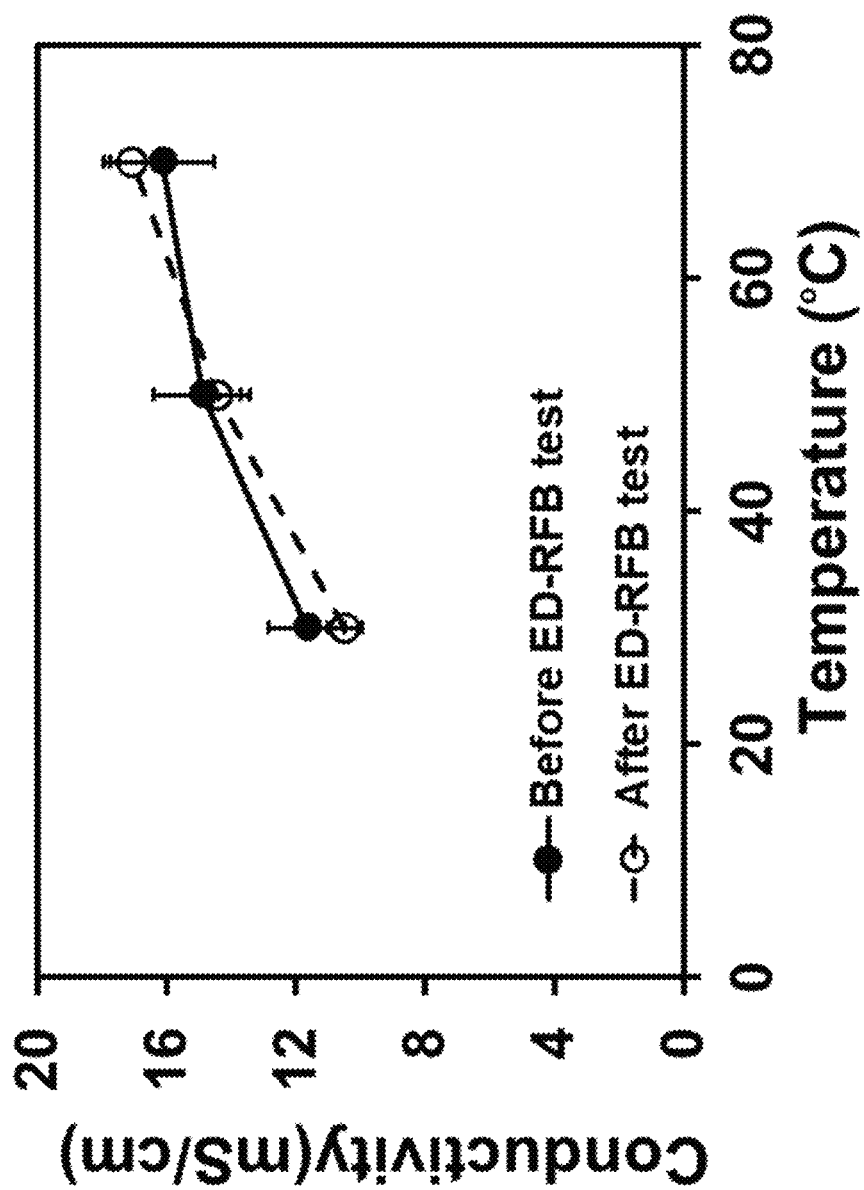
FIG. 12 is an exemplary embodiment of in-plane membrane conductivity measurements for a CM-SEBS-30-TMA AEM separator in accordance with the present disclosure before and after ED-RFB cycling.

The key to long-term use of this ED-RFB configuration in the field is the chemical stability and sustained selectivity of the separator. The sustained selectivity of the CM-SEBS-30-TMA separators has been demonstrated by the minimal capacity fade achieved over long-term cycling. The chemical stability of these separators was examined by looking for evidence of loss of the functionalizing cation. It is known in the art that by using FT-IR spectroscopy, the C—N stretch characteristic of the TMA$^+$ cation can be used to verify the stability of the CM-SEBS-30-TMA AEM. As seen in FIG. 11, the C—N stretch is evident in both the pristine membrane and the membrane after long-term cycling indicating no loss of the TMA$^+$ cation. The apparent loss in intensity was not evidence of AEM degradation as the ratio between the C=C bend and C—N stretch remained constant. To rule out other degradation routes, the Cl$^-$ conductivity of the membrane before and after ED-RFB testing was measured. The conductivity showed no decline within experimental error, indicating no membrane degradation within the about 150-hour duration of the experiments as depicted in FIG. 12. Thus, the CM-SEBS-30-TMA AEM separator was found to be chemically stable over the course of long-term cycling.

Conclusions

An electrode-decoupled redox flow battery (ED-RFB) with excellent energy efficiency, long cycle life, and environmentally friendly electrolyte formulation has been demonstrated. The change in cation solvation structure (compared to H$_2$SO$_4$ based electrolytes) brought about by the use of $CH_3SO_3H$ greatly improved separator selectivity and minimized cation cross-over. The demonstrated flow battery has 40% greater theoretical volumetric capacity and a 30% enhancement in practical volumetric capacity. The use of methanesulfonic acid supported V and Ce electrolytes and a highly permselective polystyrene-block-poly(ethylene-ran-butylene)-block-polystyrene (SEBS) triblock copolymer anion exchange separator enabled a >95% reduction in capacity fade compared to standard $H_2SO_4$ supported V—Ce ED-RFBs. The separator was highly acid stable with no changes in its FT-IR spectra and ionic conductivity before and after cycling.

In summary, the 30% improvement in capacity, 2.4% capacity fade over 100 cycles and about 70% energy efficiency demonstrated by the methanesulfonic-acid-based V—Ce ED-RFB makes it an excellent candidate for various energy storage applications. In addition, the use of $CH_3SO_3H$, a "green" chemical with low toxicity and easy effluent treatment facilitates scale-up and grid-scale deployment. The demonstrated capacity retention and fast response times of the ED-RFB enables its application in frequency regulation and demand-response when coupled with an intermittent power source (such as solar or wind) while the modular nature and sub-linear cost scaling enable applications in weak grid and off-grid energy storage applications. Engineering Block Co-Polymer Anion Exchange Membrane Domains for Highly Efficient Electrode-Decoupled Redox Flow Batteries Anion exchange membranes (AEMs) with high permselectivity, chemical stability and mechanical robustness are a key enabling technology for a variety of electrochemical energy conversion and storage systems such as fuel cells, redox flow batteries and water electrolyzers. Chemically stable triblock co-polymer AEMs derived by the chloromethylation (CM-) and subsequent trimethylamine (TMA) functionalization of polystyrene-block-poly(ethylene-ran-butylene)-block-polystyrene (SEBS) block co-polymers were examined. Using small angle X-ray scattering (SAXS) it was shown that the introduction of a hydrophobic reinforcement matrix disrupts phase segregation and decreases ionic domain sizes in these AEM separators. The reinforcement matrix simultaneously causes the ultimate tensile strength (UTS) of the reinforced separator to increase by almost 600% compared to the unreinforced form, while maintaining comparable elasticity (ca. 500% elongation at break). Such reinforced r-SEBS30-TMA separators enable electrode-decoupled redox flow batteries (ED-RFBs) with significantly improved lifetimes by decreasing per cycle capacity fade from 0.5% to <0.05%. This 10× improvement in operando permselectivity opens the door to ED-RFBs employing inexpensive elemental actives achieving decades-long usable lifespans.

The present disclosure further integrates a porous, mechanically robust reinforcement matrix made of extended polytetrafluoroethylene (e-PTFE) with the SEBS ionomer to impart its mechanical strength to the separator. The reinforcement matrix was found to disrupt phase-segregation of the SEBS block co-polymer as seen from small angle X-ray scattering (SAXS) and this effect significantly improved its permselectivity. The reinforced AEMs (r-SEBS-TMA) were prepared and utilized as separators for a V—Ce RFB and the performance of V—Ce ED-RFBs using r-SEBS30-TMA, SEBS30-TMA (30: 70 molar ratio of styrene to rubber), and Nafion® 212 as the separator were compared. The r-SEBS-TMA separators were also found to be stable in acidic RFB electrolytes at 40° C., ensuring that they can be deployed under practical operational conditions in RFBs. After 40 charge/discharge cycles, a V—Ce RFB with r-SEBS30-TMA as separator was able to maintain 98% of its initial capacity (0.05% capacity loss per cycle) with no loss in AEM separator mechanical strength.

EXAMPLES

Materials. Chlorobenzene (99.5%), 1,2-dichlorobenzene (analytical standard), tin(IV) chloride (99.995%), chlorotrimethylsilane (99%), chloroform (99.5%), methanol (99.9%), paraformaldehyde (99.5%), silver nitrate (0.1N), potassium thiocyanate (0.1N), sodium nitrate (99%), chloroform-d (99.96%), 1-methyl-2-pyrrolidinone (99.7%), trimethylamine solution (31%-35% weight percent in ethanol), sulfuric acid (99.999%), vanadium (IV) oxide sulfate (97%) and cerium (IV) sulfate (97%) were purchased from Sigma Aldrich. SEBS ($M_n$=118000 g/mol, 30:70 molar ratio of styrene to rubber) was obtained from Sigma Aldrich. Expanded PTFE (ePTFE) were purchased from Donaldson Company Inc. (properties listed in Table 3) and the PTFE sheet to fabricate the non-porous base for separator preparation was obtained from McMaster-Carr.

TABLE 3

Physical properties of ePTFE reinforcement.

| Property | |
|---|---|
| Thickness (μm) | 25.4 ± 3 |
| Gurley air flow (1 inch$^2$ at 4.88 inch water) (s) | 25 ± 2 |
| IPA bubble point (47 mm ϕ sample) (KPa) | 345 ± 28 |
| Ultimate tensile stress (MPa) | 17 ± 3 |
| Elongation at break (%) | 339 ± 42 |
| Modulus (MPa) | 14 ± 1.4 |
| Ultimate tensile stress (after acid soak) (MPa) | 15 ± 3 |
| Elongation at break (after acid soak) (%) | 260 ± 50 |
| Modulus (after acid soak) (MPa) | 13.6 ± 4 |
| Thermal degradation onset (° C.) | 500 ± 10 |
| Swelling ratio (%) | No appreciable swelling |
| Water uptake (%) | No appreciable water uptake after blotting out the film adsorption |

Figure 13:
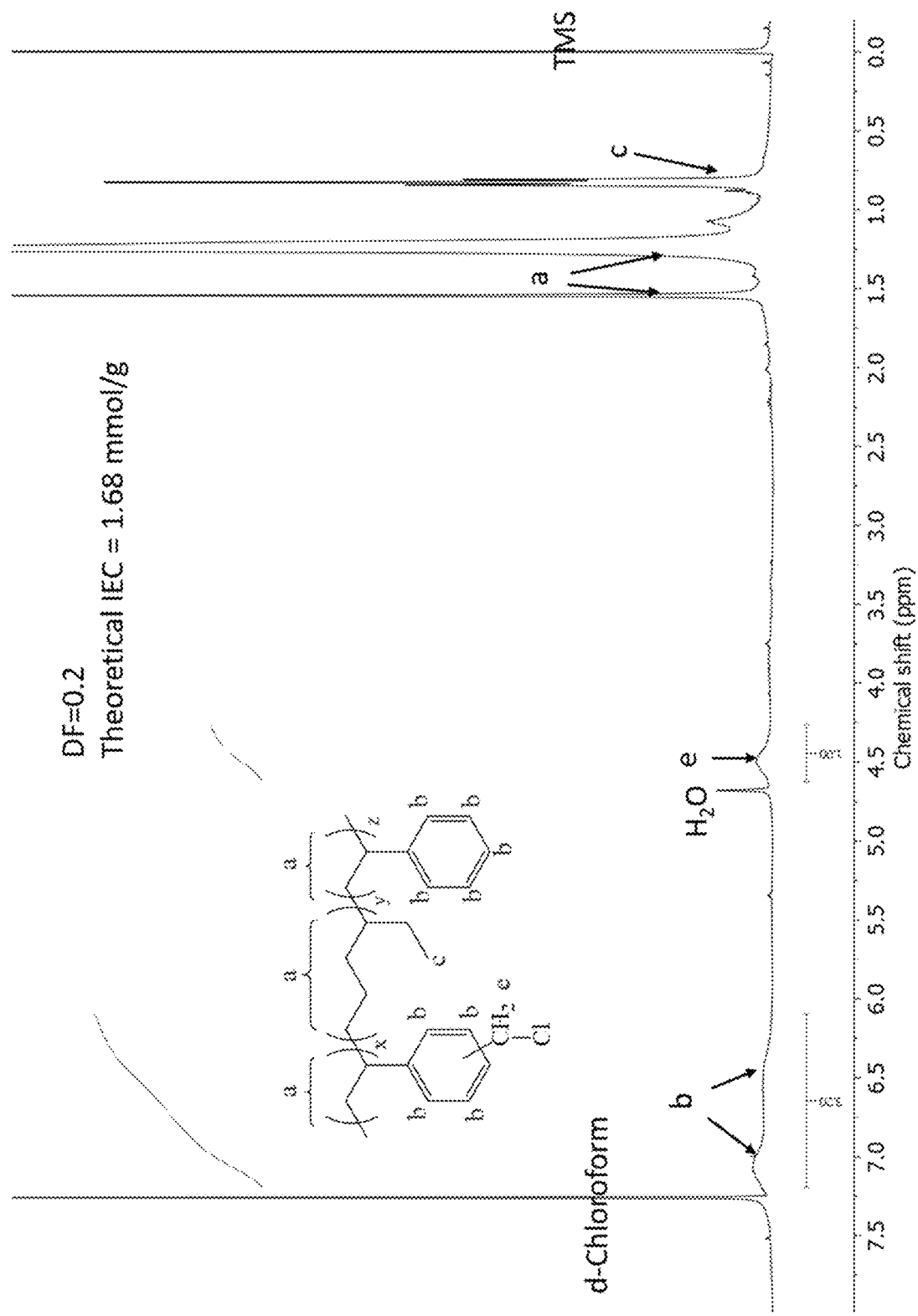
FIG. 13 is an exemplary embodiment of an $^1$H NMR spectrum of CMSEB S30 in accordance with the present disclosure. Peaks a and c correspond to the protons on aliphatic backbone. Peaks b correspond to the protons the aromatic ring. The new peak e demonstrated that the chloromethylation reaction occurred in the SEBS. The $^1$H NMR experiment was performed in chloroform-d with TMS, which was used as an internal standard for calibrating the chemical shift of $^1$H.

Fabrication of reinforced AEMs (r-SEBS30-TMA). The detailed method of synthesizing and characterizing chloromethylated SEBS (CMSEBS30) was previously reported elsewhere. The $^1$H-NMR spectrum of CMSEBS30 is shown in FIG. 13. The DF value for CMSEBS30 was calculated using Equation 6.

$$\frac{\frac{Area(e)}{2}}{\frac{Area(b) + \frac{Area(e)}{2}}{5}} \times 0.3 \quad \text{(Equation 6)}$$

Figure 14A:
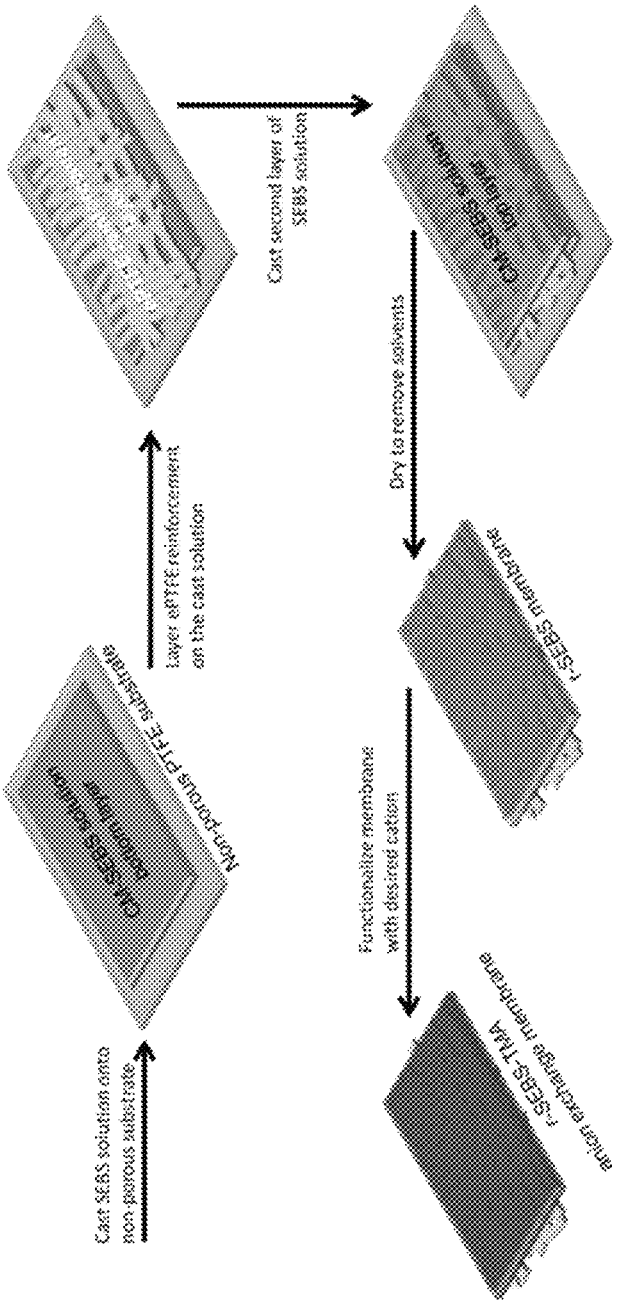
FIGS. 14A-B are exemplary embodiments of preparation and functionalization of r-SEBS membranes in accordance with the present disclosure.
Figure 14B:
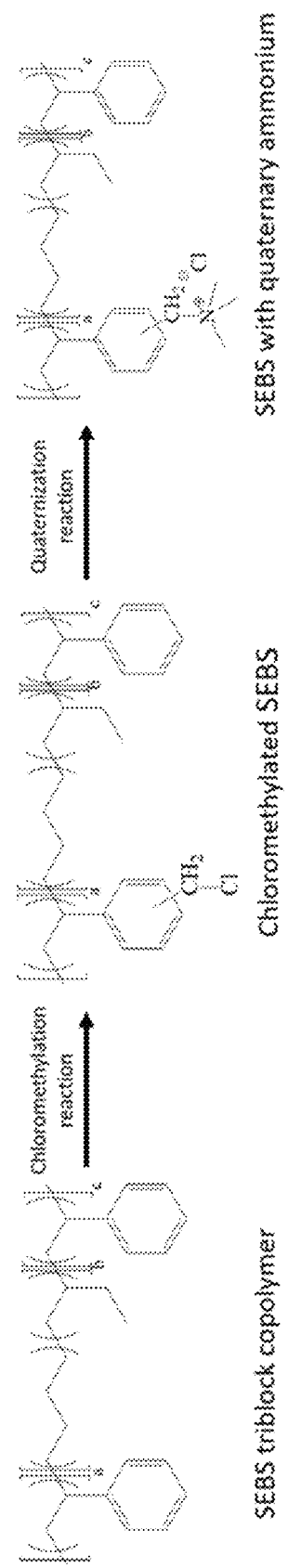
Figures 15A, 15B:
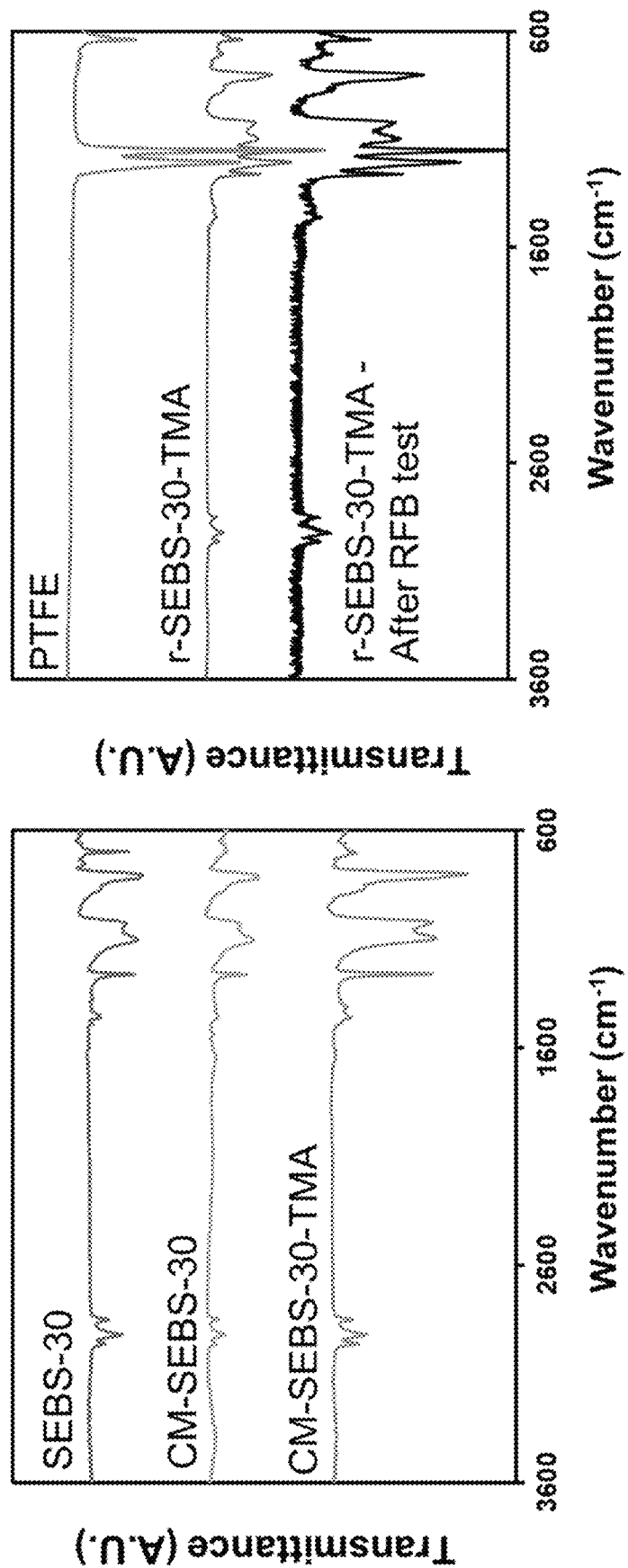
FIGS. 15A-B are exemplary embodiments of FTIR spectra in accordance with the present disclosure.

The obtained CMSEBS30 has a degree of functionalization (DF) value of 0.20, which leads to a theoretical IEC of 1.68 mmol/g. The method of impregnating CMSEBS30 and an illustration of chemical reactions for chloromethylation and functionalizing CMSEBS30 are shown in FIGS. 14A-14B. The base used to support the ePTFE reinforcement layer was made of PTFE. A hollow depression was machined into this sheet with a lip on all four edges with a height of 2 mm. The depression was partially filled with 10 mL of 5% CMSEBS30 in 1,2-dichlorobenzene solution, the ePTFE layer was laid on top of this layer and an additional 10 mL of the CMSEBS30 solution was cast on top. 1,2-dichlorobenzene wets the ePTFE and hence the solution filled out the pores of the ePTFE as seen from the cross-sectional SEM images in FIGS. 15A-15B. As a visual confirmation, the ePTFE substrate, which is normally opaque white, becomes clear when filled with polymer. Finally, the ePTFE reinforced membrane was dried at 60° C. on a hot plate and hot-pressed at 110° C. and 300 psi for five minutes to ensure surface uniformity. The reinforced, chloromethylated SEBS30 membrane was then functionalized with the TMA cation. The thickness of the SEBS30-TMA and r-SEBS30-TMA membranes are 72 µm and 50 µm, respectively.

Membrane Characterization.

Ion exchange capacity (IEC). The IECs of membranes in chloride form (i.e. ion exchanged to ensure the mobile anions are Cl⁻ ions) were determined by the argentometric Volhard titration method. A vacuum dried SEBS-based AEM in the chloride form (dried at <0.1 inHg at 60° C. for 12 hours) was weighed (about 0.1 g) and immersed in 20 mL of 1 M sodium nitrate for 48 h at room temperature. Subsequently, 5.0 mL of 0.1 M silver nitrate (an excess being added to ensure the complete precipitation of the chloride) was added to precipitate the chloride ions with a white silver chloride precipitate being observed if the membrane had any IEC. Quantification was carried out by titration with 0.1 M potassium thiocyanate (0.1 M KSCN, standard solution) using 2-3 drops of 11 wt % iron (III) nitrate in DI water as indicator with the end point being a color change from a light orange to a medium-dark orange color. A control sample was prepared by mixing 20 mL of 1 M $NaNO_3$ with 5.0 mL of 0.1 M $AgNO_3$ and 2-3 drops of 11 wt % of $Fe(NO_3)_3$ and titrated with 0.1 M KSCN. The difference in volume used to titrate the control solution and the sample solution was used for calculating the IEC (see Equation 12):

$$IEC_{Cl^-} [\text{mmol g}^{-1}] = \frac{(Vol_{cont.} - Vol_{test}) \cdot 100 \text{ mM } KSCN}{Wt_{dry}} \quad \text{(Equation 12)}$$

where, $IEC_{Cl^-}$ was the experimental ion-exchange capacity (mmol g⁻¹); $Vol_{cont.}$ was the volume of 0.1 M KSCN used to titrate the control sample (L); $Vol_{test}$ was the volume of 0.1 M KSCN used to titrate the sample (L); and $Wt_{dry}$ was the weight of the AEM (g).

Ionic conductivity. In-plane ionic conductivity measurements were carried out in a 4-point conductivity cell (BT-110, Scribner Associates) using electrochemical impedance spectroscopy (EIS) to measure the resistance. A 1 cm×3 cm membrane was placed in the PTFE conductivity cell in contact with the 4 platinum electrodes and immersed in a temperature-controlled DI water bath. A Gamry series G750 potentiostat was used to measure the impedance in the frequency range 100 kHz to 0.1 Hz. The high frequency resistance was estimated from the Bode plots (corresponding to a phase angle of zero). The membrane conductivity was calculated using Equation 13:

$$\sigma = \frac{L}{R \cdot t \cdot w} \quad \text{(Equation 13)}$$

where, σ was the in-plane membrane conductivity (mS cm⁻¹); R was the in-plane membrane resistance (mOhm); t was the membrane thickness (fully hydrated) (cm); w was the membrane width (fully hydrated) (cm); L was the distance between the two inner electrodes (cm).

Mechanical properties. The tensile tests for r-SEBS30-TMA and SEBS30-TMA AEMs were performed using a Q800 differential mechanical analyzer (TA instruments) equipped with a humidity chamber. The membrane sample (approximate dimensions: 50 mm×5 mm×0.05 mm) was fixed in a film tension clamp using a torque of 3 lbF×in. The experiments were performed at 25° C. and 100% RH. The membrane was stretched at 0.5 MPa min⁻¹ until the sample broke. The ultimate tensile strength and the elongation at the break point are reported in Table 4.

TABLE 4

Properties of fabricated r-SEBS30-TMA and SEBS30-TMA.

|  | r-SEBS30-TMA | SEBS30-TMA |
|---|---|---|
| Experimental IEC (mmol/g) | 1.16 ± 0.1 | 1.35 ± 0.02 |
| Chloride conductivity (@70° C., mS/cm) | 16 ± 2.6 | 18 ± 3 |
| Ultimate tensile stress (MPa) | 17 ± 2 | 3.1 ± 0.6 |
| Elongation at break (%) | 500 ± 10 | 536 ± 7 |
| Permselectivity (%) | 80 | 73 |
| Transport number ($t_{Cl^-}$:$t_{K^+}$) | (0.9:0.1) | (0.87:0.13) |

Ion permselectivity and transport numbers. Membrane permselectivity and transport numbers were measured using the membrane potential method in a lab-made diffusion cell. The AEM was clamped between two well-stirred compartments containing different concentrations of the same salt (0.1 M and 0.5 M KCl). Two identical calomel reference electrodes were used to measure the potential difference ($E_s$ (mV)) between the two solutions arising from the different mobilities of chloride and potassium ions through the membrane. The membrane potential was used to calculate the membrane permselectivity (selectivity of the anion exchange membrane towards anions) and the transport numbers (in this case for chloride and potassium). The following equation was used to calculate anion and cation transport numbers and membrane permselectivity:

$$E_m = (2t_- - 1)\left(\frac{RT}{F}\right)\ln\left(\frac{a_A}{a_B}\right) = (t_- + t_+)\left(\frac{RT}{F}\right)\ln\left(\frac{a_A}{a_B}\right) \quad \text{(Equation 14)}$$

where $t_+$ and $t_-$ are the transport numbers for the cation (K⁺) and the anion (Cl⁻) respectively, $a_A$ and $a_B$ are the activities of the electrolyte (KCl) in the concentrated and diluted compartments separated by the membrane, T is the absolute temperature, R is the gas constant and F is the Faraday constant. The coefficient ($2t_- - 1$) is commonly referred as the membrane permselectivity and represents the difference between the transport numbers for anions and cations.

Scanning electron microscopy (SEM). The AEM separators were subject to cross-sectional SEM imaging (FEI Nova 230) to verify complete functionalization and (in case of r-SEBS-30-TMA) to verify that the pores of the ePTFE reinforcement matrix are filled with the ionomer. The SEM operational parameters were beam energy of 10 kV, chamber pressure of 9×10⁻³ Pa and chamber temperature of 23° C. The cross-sectional AEM samples were obtained by sectioning the AEM samples following freezing dry samples in liquid $N_2$. The samples, being poorly electrically conducting, were subject to Au sputter coating in a Leica ACE600 high vacuum sputter coater. The cross-sectional samples were subjected to energy dispersive analysis of X-rays (EDAX) mapping for carbon (from the ionomer backbone and functional group), fluorine (from the ePTFE reinforcement) and chlorine (associated with the functional group).

Small angle X-ray scattering (SAXS). Small angle X-ray scattering measurements were performed on a SAXSLAB GANESHA 300 XL SAXS system equipped with a GeniX 3D Cu Ultra Low Divergence micro focus sealed tube source. The wavelength λ was 1.54 Å. The detector used was hybrid pixel Dectris Pilatus 300K 2D CMOS photon counting detector. Silver behenate was used for calibration of the beam center and the q-range before measurement. The corrected SAXS patterns were azimuthally averaged to obtain one dimensional SAXS profiles. SAXSGUI v2.19 software was used to analyze the data.

Figure 16A:
FIGS. 16A-B are exemplary embodiments of an ex-situ temperature-controlled membrane cross-over experiment in accordance with the present disclosure.
Figure 16B:

Ex-situ permeability test. The permeability of the membrane separator was tested ex-situ using a 10 mL, water-jacketed PermeGear diffusion cell (shown FIGS. 16A-16B) at 40° C. The temperature was maintained by constantly circulating water from a water bath into the out jacket of the diffusion cell. Samples were taken at the end of 30 days and the concentration of V on the Ce-side and Ce on the V-side was measured using inductive coupled plasma optical emission spectroscopy (ICP-OES).

Inductive coupled plasma optical emission spectroscopy (ICP-OES). The ICP-OES measurements were carried out using a PerkinElmer Optima 7300DV instrument. The instrument was calibrated with the appropriate PerkinElmer standards containing V and Ce. The standards were diluted using trace metals grade $HNO_3$ and calibration curves with a linear fit regression coefficient of determination ($R^2$) of at least 0.99 were obtained. The V measurements were carried out using a scandium internal standard. No internal standard was used for the determination of Ce concentration to avoid interference from the prominent lines of scandium.

Single-cell RFB testing. RFB experiments were carried out in an acid-resistant single cell with an active area of 25 $cm^2$ (Scribner Inc.) whose schematic is depicted in FIG. 1. The RFB was assembled by sandwiching the r-SEBS30-TMA AEM (with a thickness chosen to be equivalent to SEBS30-TMA and Nafion®212) between two graphite felt electrodes (SGL Carbon, Sigracell® GFA6) previously activated by heating in an oven at 400° C. for 30 hours. The electrolyte in the negative compartment (200 mL) contained 0.5 M $V^{2+}$ in 1M $H_2SO_4$. The positive compartment (200 mL) contained 0.5 M $Ce^{4+}$ in 1M $H_2SO_4$. The active redox species were $V^{3+}/V^{2+}$ in the negative electrode and $Ce^{4+}/Ce^{3+}$ in the positive electrode and their electrode reactions are as follows $$V^{3+}+e^- \leftrightarrow V^{2+} (E^0=-0.26 \text{ V}) \quad \text{(Equation 1)}$$

$$Ce^{4+}+e^- \leftrightarrow Ce^{3+} (E^0=1.61 \text{ V}) \quad \text{(Equation 3)}$$

A redox cell test system (model 857, Scribner Associates, Inc.) comprising a fluid control unit and a potentiostat with impedance spectroscopy capabilities was employed in the experiments. System control and data acquisition employed the Flow Cell software (Version 1.1, Scribner Associates, Inc.). The RFB was charged and discharged at a constant current density of 50 mAcm$^{-2}$ at room temperature (approx. 21° C.). Both solutions were circulated through the electrodes using Cole-Parmer peristaltic pumps at a constant flow rate of 100 mL min$^{-1}$. The RFB was considered charged once the cell voltage reached 2 V and discharged when the cell voltage dropped below 0.65 V (cutoff voltages).

The current efficiency (CE), voltage efficiency (VE) and energy efficiency (EE) were calculated using the following equations:

$$CE=Q_d/Q_c \times 100\% \quad \text{(Equation 15)}$$

$$VE=E_d/E_c \times 100\% \quad \text{(Equation 16)}$$

$$EE=CE \times VE \times 100\% \quad \text{(Equation 17)}$$

where $Q_d$ and $Q_c$ were the discharge and charge capacities (Ah/L), and $E_d$ and $E_c$ were the average charge and discharge voltages respectively.

Results and Discussion

FIGS. 17A and 17E depict the SEM cross-section of SEBS30-TMA and reinforced SEBS-30-TMA (r-SEBS30-TMA) membranes. The distribution of carbon, chlorine, and fluorine across the cross-sectional area of SEBS30-TMA separators is depicted in FIGS. 17B, 17C, and 17D. The separator's polymeric backbone and the functional group both contributed to the carbon signal and served as the backdrop for the chlorine and fluorine signals. The uniform chlorine distribution confirmed the uniformity of the chloromethylation reaction, functionalization, and subsequent chloride ion exchange of the separator. Minimal fluorine (within experimental error) was seen in SEBS-30-TMA as expected for an unreinforced separator with no apparent source of fluorine signals. FIGS. 17F, 17G, and 17H show the distribution of carbon, chlorine, and fluorine inside r-SEBS30-TMA. The strong, evenly distributed signal of fluorine overlapping with carbon across the cross-section of r-SEBS30-TMA provided clear evidence that the SEBS30-TMA solution was able to permeate the pores of the ePTFE reinforcement. The uniform distribution of chlorine across the separator cross-section with intensities (a visual representation of the EDAX signal counts) comparable to that of unreinforced SEBS-30-TMA indicated that the TMA functionalization and subsequent chloride ion exchange was not affected by presence of the ePTFE reinforcement. This explained the minimal change in the IEC and ionic conductivity. The cross-section SEM images with EDAX spectra of SEBS30-TMA, ePTFE reinforcement, and r-SEBS30-TMA membranes are also shown in FIGS. 18A-18F.

Figure 19:
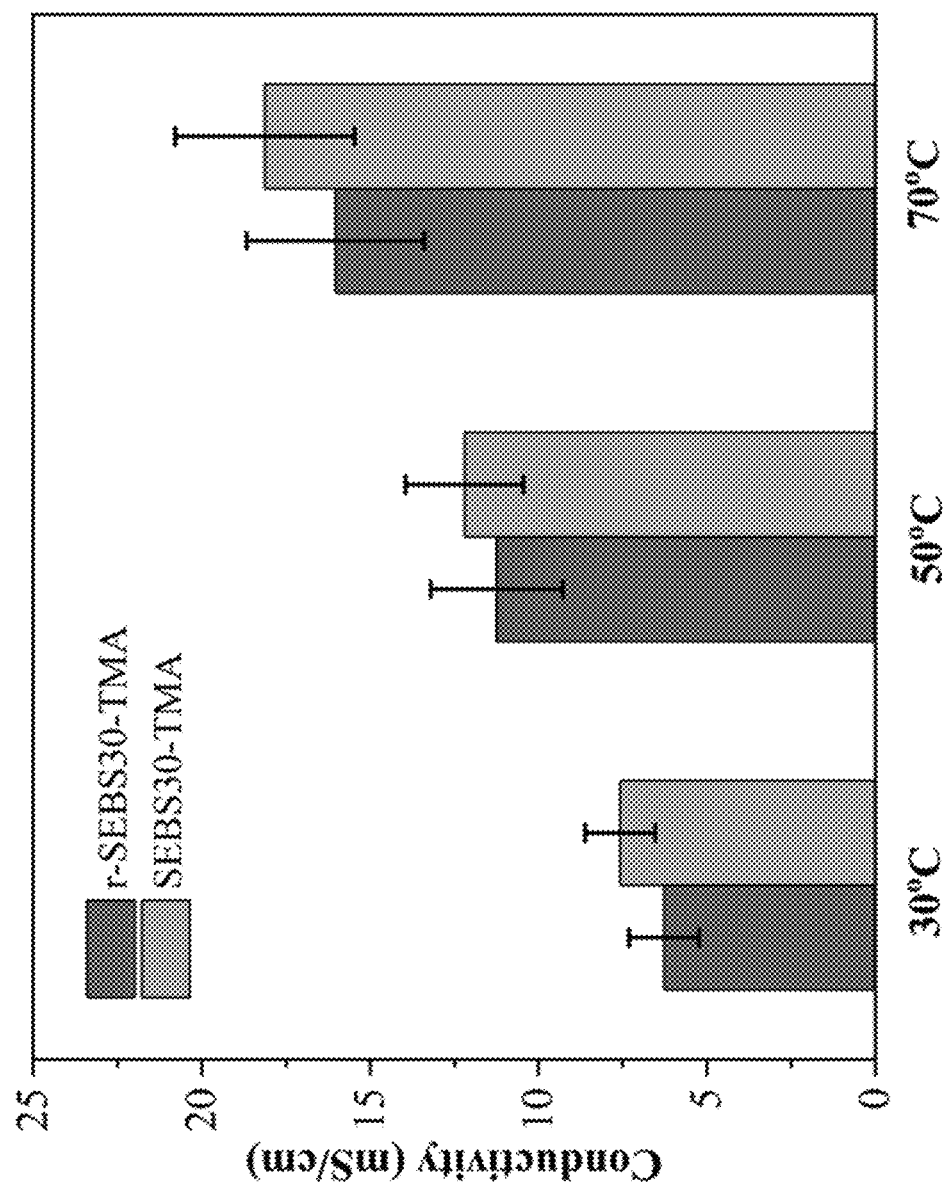
FIG. 19 is an exemplary embodiment of in-plane chloride ion conductivity of r-SEBS30-TMA and SEBS30-TMA in accordance with the present disclosure.
Figure 20:
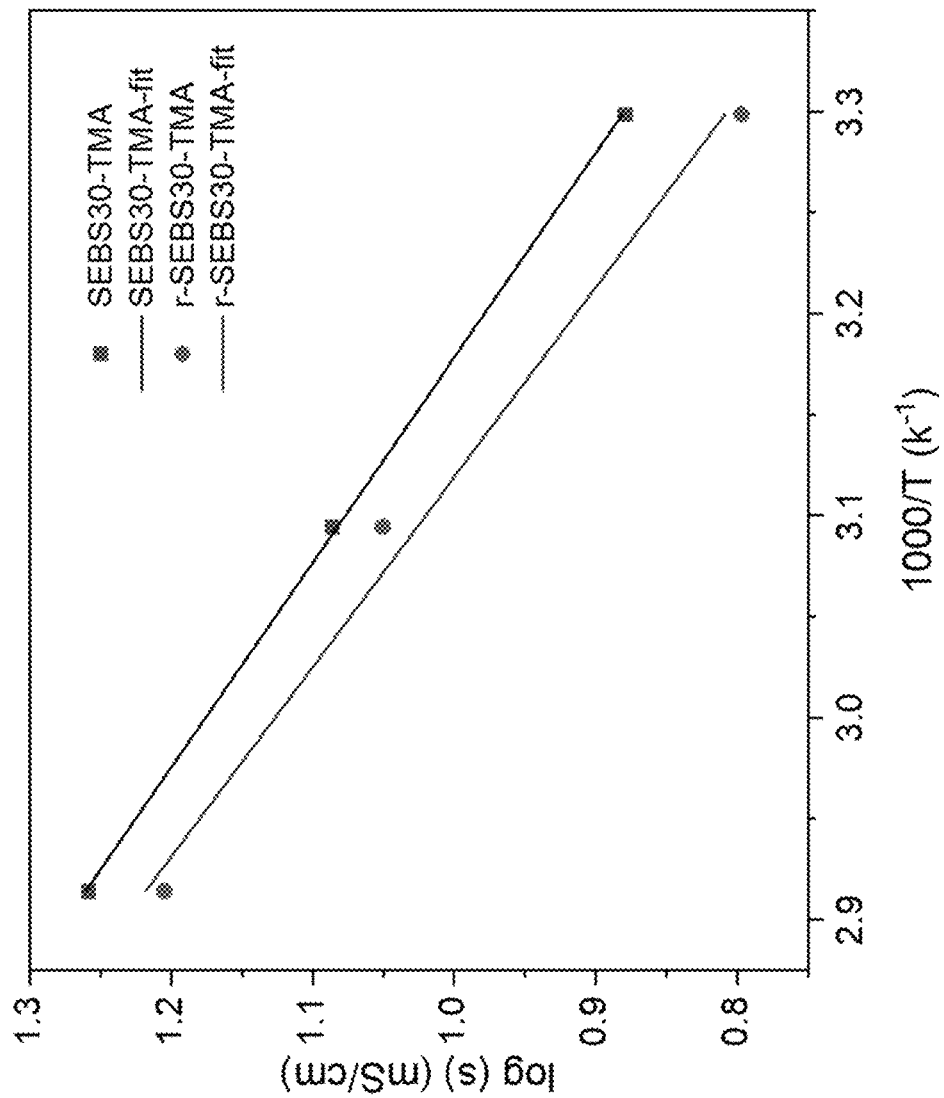
FIG. 20 is an exemplary embodiment of an Arrhenius plot of ln σ vs. inverse temperature for SEBS-based AEMs in accordance with the present disclosure.
Figure 21:
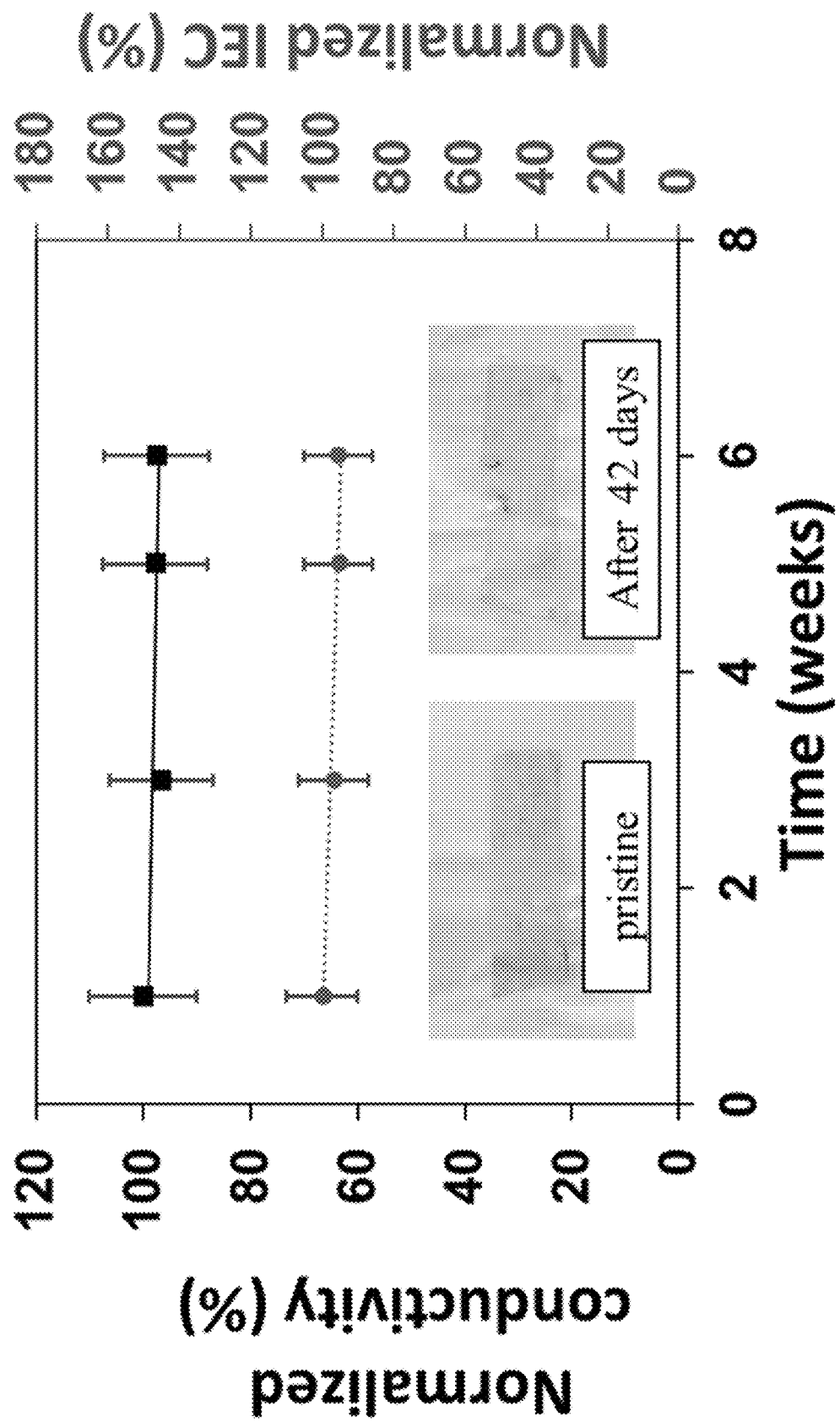
FIG. 21 is an exemplary embodiment of representative acidic stability of r-SEBS-based separators over the course of continuous immersion in 1M acid solution at 40° C. in accordance with the present disclosure.
Figure 22:
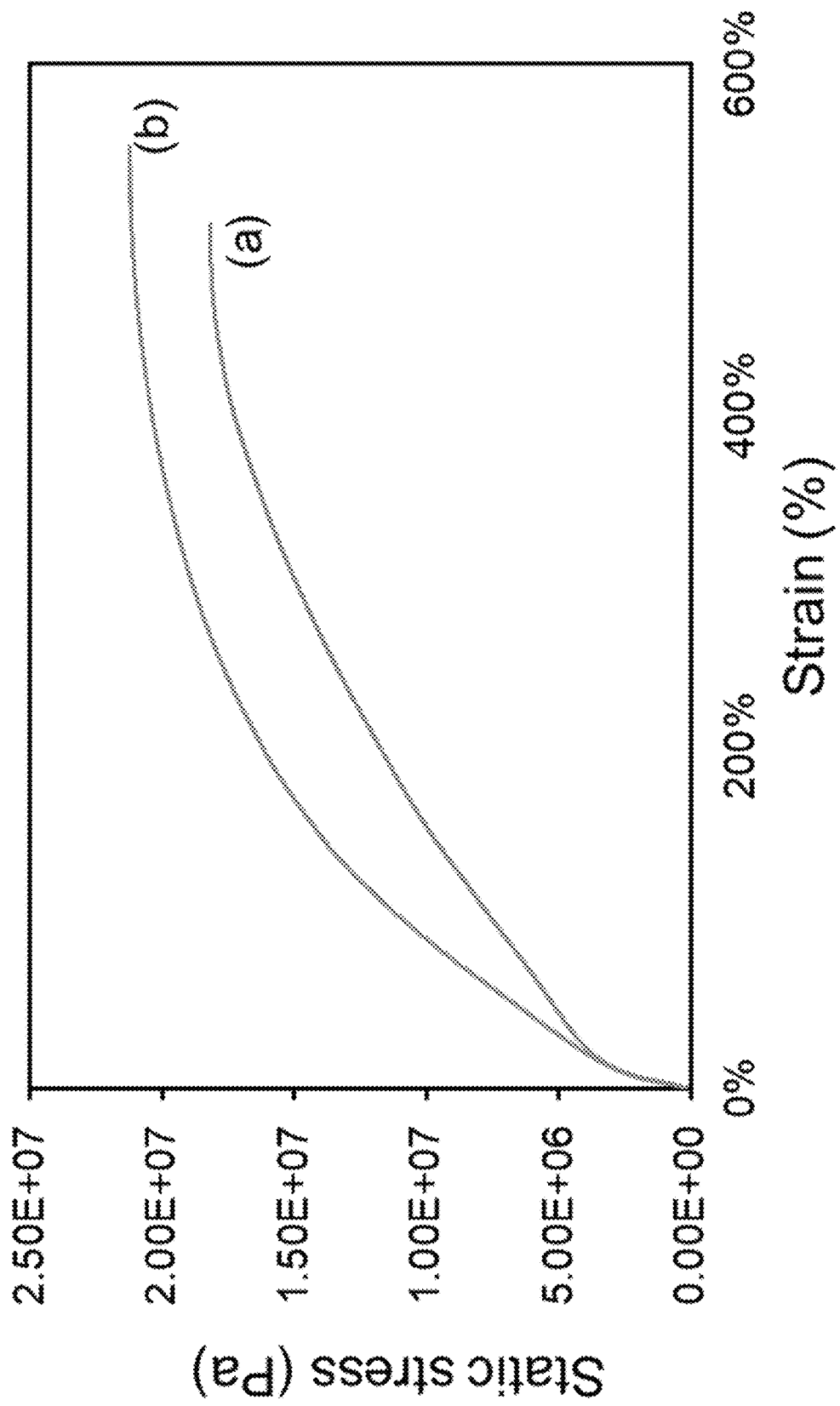
FIG. 22 is an exemplary embodiment of stress-strain curves of r-SEBS-TMA and r-SEBS before TMA functionalization in accordance with the present disclosure. FIG.

The properties of the r-SEBS-30-TMA separator are listed in Table 4 and compared to the unreinforced SEBS-30-TMA. A four-probe conductivity cell was used to determine the chloride ionic conductivities (σ) of SEBS30-TMA and r-SEBS30-TMA membranes (FIG. 19). The chloride ionic conductivity of SEBS30-TMA was slightly higher than that of r-SEBS30-TMA at all temperatures. Even at 70° C., the chloride ionic conductivity of SEBS30-TMA was 18 mS/cm compared to 16 mS/cm for r-SEBS30-TMA (only a 12% decrease in ionic conductivity). This is attributable to the lower ion exchange capacity (IEC) (1.18 mmol/g) of r-SEBS30-TMA, compared to SEBS30-TMA (1.34 mmol/g). Given this relatively small decrease in conductivity, no significant increase in the resistance of the RFB was expected. Thus, with minimal increase in the ohmic overpotential losses, changes to the voltage and energy efficiencies were also expected to be small upon transitioning to the reinforced separators. The Arrhenius plot of ln σ vs. inverse temperature for SEBS-based AEMs is shown in FIG. 20. The activation energy (Ea) for SEBS30-TMA to transport chloride ion in aqueous is 8.21 kJ/mol and for r-SEBS30-TMA is 8.85 kJ/mol. These Ea values are very close to Nafion® membranes (9.6 kJ/mol) mainly due to the fast ion transport in phase segregated domains. The separators were also immersed in representative RFB electrolytes for over 6 weeks at 40° C. As seen from FIG. 21, minimal changes in conductivity and IEC were observed over the course of this chemical stability test. The ultimate tensile strength (UTS) of the r-SEBS-30-TMA separator was found to increase almost 600% compared to the unreinforced form while exhibiting comparable elasticity (ca. 500% elongation at break) to SEBS30-TMA (Table 4 & FIG. 22), thus anticipating an increased useful lifespan of the separator under operational conditions. Chen at al. synthesized polyphenylsulfone-based AEMs with different IEC values. Varying the IEC values of the AEMs yielded materials with different conductivity to permeability ratios. It is apparent that an AEM with relatively low IEC will induce high ohmic losses and decrease the power output of the cell whereas an AEM with high IEC results in high crossover of active species. It has been demonstrated that it is indeed possible to fine tune the IEC of a separator to decrease water uptake and improve permselectivity. This approach requires extremely precise control over the extent of the functionalization reaction thus making it impractical for large scale adoption.

Alternatively, as described herein, the introduction of a (preferable hydrophobic) reinforcement layer with tortuous pores in turn decreases cation cross-over through the hydrophilic, anion-conductive channels in the triblock copolymer AEM. The measured permselectivity and transport numbers (Table 4) do indicate higher selectivity for the cross-over of the anion, thus confirming that the introduction of ePTFE reinforcements alters the phase segregation behavior of SEBS, in turn affecting the conductive ion channel formation in the separator. Higher permselectivity was observed across r-SEBS30-TMA (80%) compared to SEBS30-TMA (73%) with r-SEBS30-TMA demonstrating the same ion transport selectivity as benchmark AEM (Tokuyama A201). These permselectivity values were obtained using singly charged $K^+$ and $Cl^-$ ions. Permselectivity will improve further with highly charged cationic species like $V^{2+}/V^{3+}$ and $Ce^{3+}/Ce^{4+}$ due to both their higher charge densities and greater difference in diffusivity compared to their counterions. The permeability of V and Ce across r-SEBS30-TMA was measured ex-situ in a diffusion cell (shown in FIGS. 16A-16B) and found to be 1.4% for V and 0.5% for Ce over 30 days using ICP-OES. Thus, simultaneous improvement of both the mechanical properties and ex-situ permselectivity is disclosed herein. Direct confirmation of any changes in phase segregation was sought using SAXS.

Figure 23:
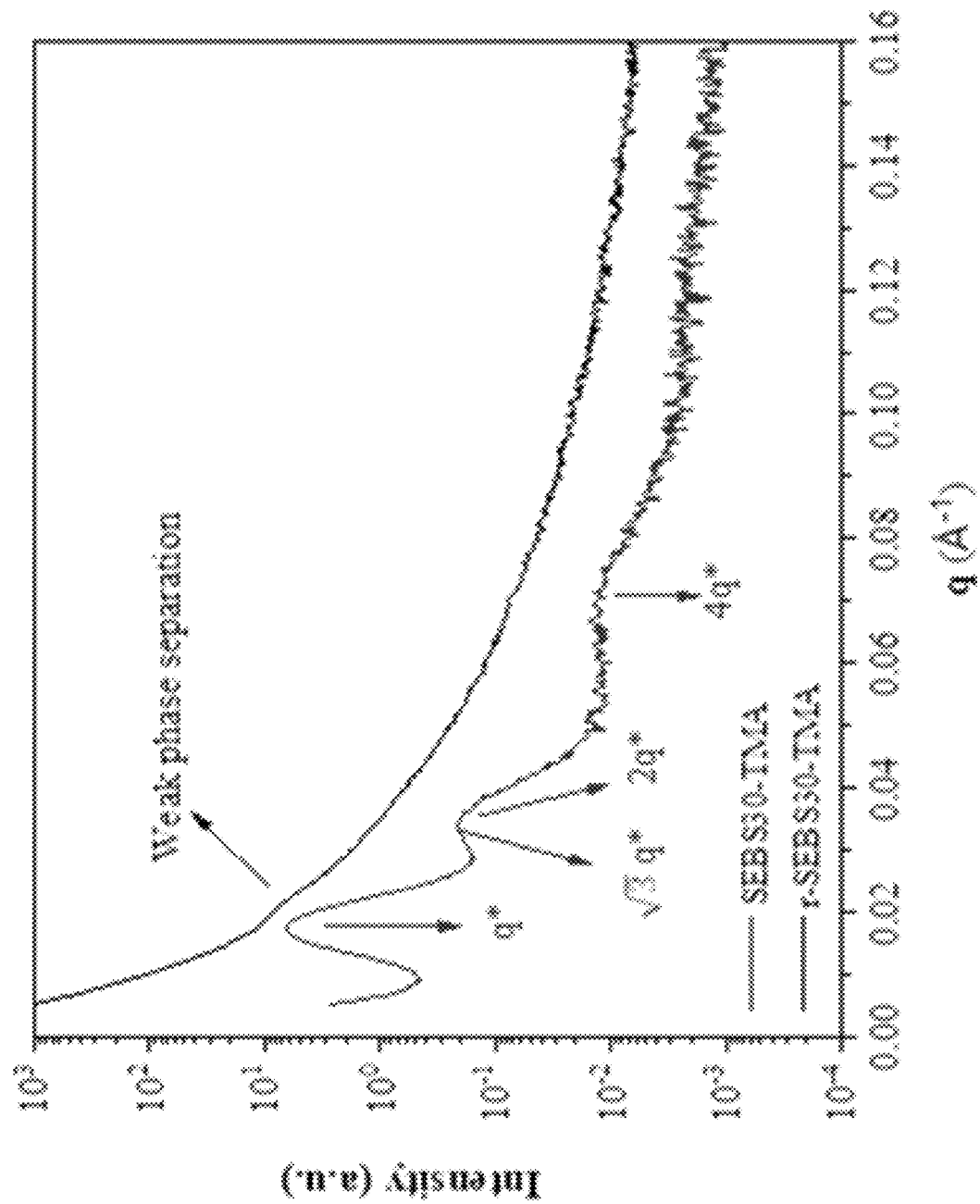
FIG. 23 is an exemplary embodiment of SAXS profiles for SEBS30-TMA and r-SEBS30-TMA measured at room temperature in accordance with the present disclosure. The data is plotted as logarithm intensity as a function of q.

FIG. 23. shows the SAXS profile of SEBS30-TMA and r-SEBS30-TMA AEM separators. SEBS30-TMA displayed multiple peaks at $q^*$, $\sqrt{3}\ q^*$, $2\ q^*$, and $4\ q^*$, suggesting a cylindrical morphology. This cylindrical morphology is in agreement with earlier observations by atomic force microscopy. This self-assembled morphology of the SEBS triblock copolymer is driven by the inherent chemical incompatibility between the styrene blocks and ethylene-co-butylene blocks. However, phase segregation morphology of r-SEBS30-TMA is less obvious than that of SEBS30-TMA due to the disruption of porous PTFE substrate without prominent peaks being observed. Applying the Bragg spacing equation ($d=2\pi/q^*$), the primary domain spacing at $q^*=0.0176$ Å$^{-1}$ was calculated to be 36 nm for SEBS30-TMA while the domain spacing at $q^*=0.0207$ Å$^{-1}$ was calculated to be 30 nm for r-SEBS30-TMA. The highly ordered scattering peaks of SEBS30-TMA suggest that the long-range grain size of SEBS30-TMA is bigger than that of r-SEBS30-TMA. It also suggests that the defect density of SEBS30-TMA is potentially much less than that of r-SEBS30-TMA. The bigger grain size and larger domain spacing of SEBS30-TMA result in larger ionic domains than that of r-SEBS30-TMA. The smaller ionic domains of r-SEBS30-TMA results in lower ionic conductivity but higher permselectivity.

Figure 24B:
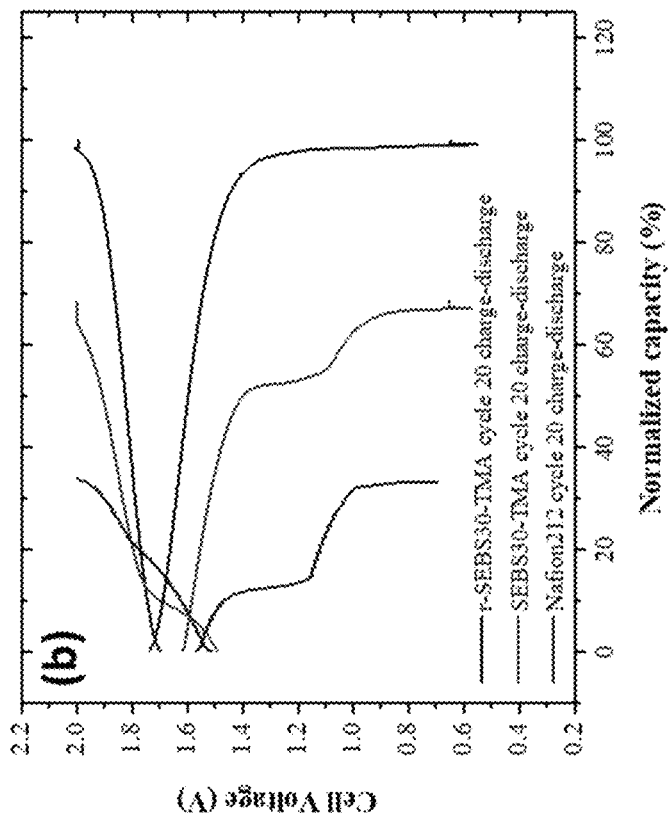
FIGS. 24A-B depict an exemplary embodiment of V—Ce RFB voltage profiles for a variety of membranes in accordance with the present disclosure.
Figure 24A:
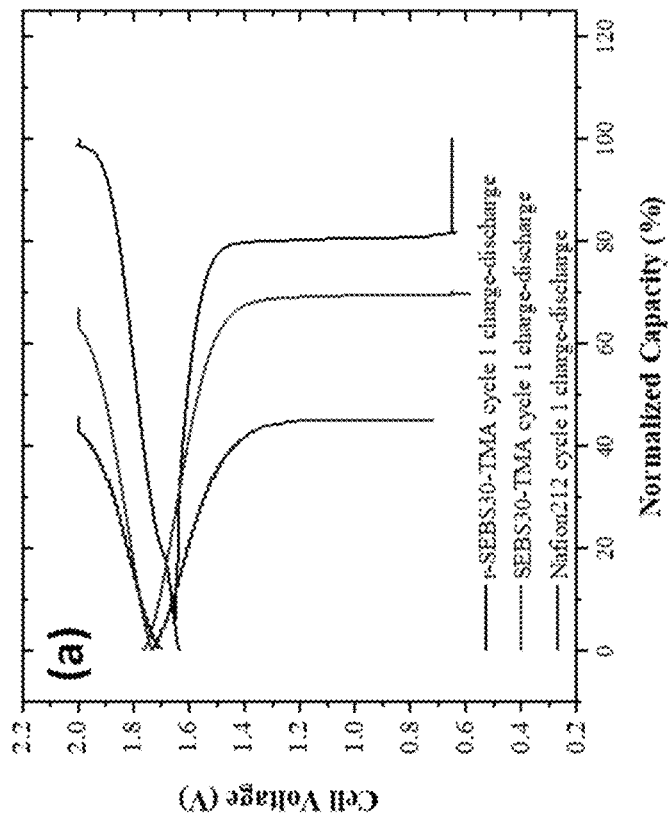

Thus, it has been demonstrated that the introduction of a porous, hydrophobic ePTFE reinforcement layer inhibits phase segregation and leads to smaller ionic domains in r-SEBS30-TMA compared to SEBS30-TMA. The resultant improvement in ex-situ permselectivity was subsequently exploited in a V—Ce ED-RFB. The voltage profiles of the V—Ce ED-RFBS employing SEBS30-TMA, r-SEBS30-TMA and Nafion®-212 (chosen to match the thickness of the AEMs) separators are depicted in FIGS. 24A-24B. The open circuit voltage (OCV) is an excellent metric for the permselectivity of a separator in an operating electrochemical cell with lower permselectivity resulting in smaller OCV. Thus, the ED-RFB employing Nafion®-212 cation exchange membrane (CEM), which allows for the facile cross-over of cations, exhibits the lowest OCV amongst all three cells and highest capacity fade over 20 cycles. The change in the OCV can be understood by applying the Nernst equation to the positive and negative electrodes. The half-cell potential for the negative electrode is given by:

$$E_{negative} = E^0 \frac{RT}{nF} \ln\left(\frac{[V^{2+}]}{[V^{3+}]}\right) \quad \text{(Equation 18)}$$

Analogously, the half-cell potential for the positive electrode is given by:

$$E_{positive} = E^0 \frac{RT}{nF} \ln\left(\frac{[Ce^{3+}]}{[Ce^{4+}]}\right) \quad \text{(Equation 19)}$$

At any given state of charge (SOC), the difference between these two equations predicts the cell OCV. This treatment assumes perfect permselectivity. In reality, V and Ce cross-over modifies both half-cell potentials (upon accounting for the cross-over species concentrations in the second term on the righthand side of Equations 18 and 19). Thus, the degree of cross-over is indicated by the deviation of the OCV from the ideal, perfectly permselective case and explains the variation in the OCV between the cells employing different separators.

Figure 25B:
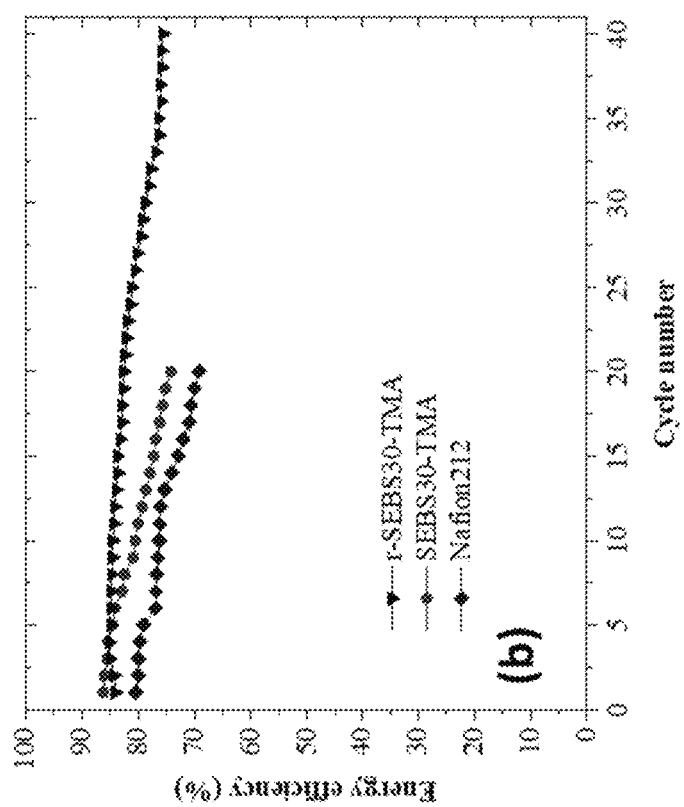
FIGS. 25A-B depict an exemplary embodiment of V—Ce RFB cycling performance for a variety of membranes in accordance with the present disclosure.
Figure 25A:
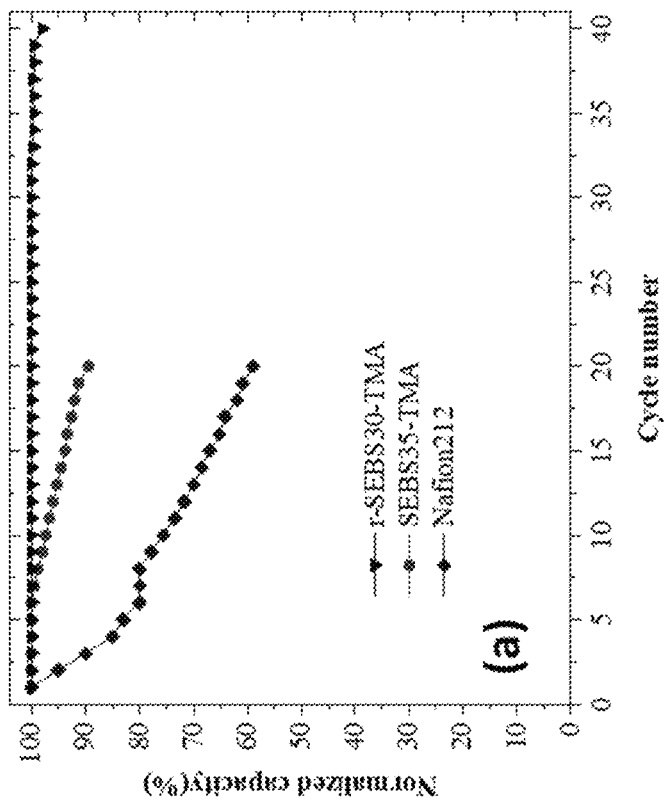
Figure 26:
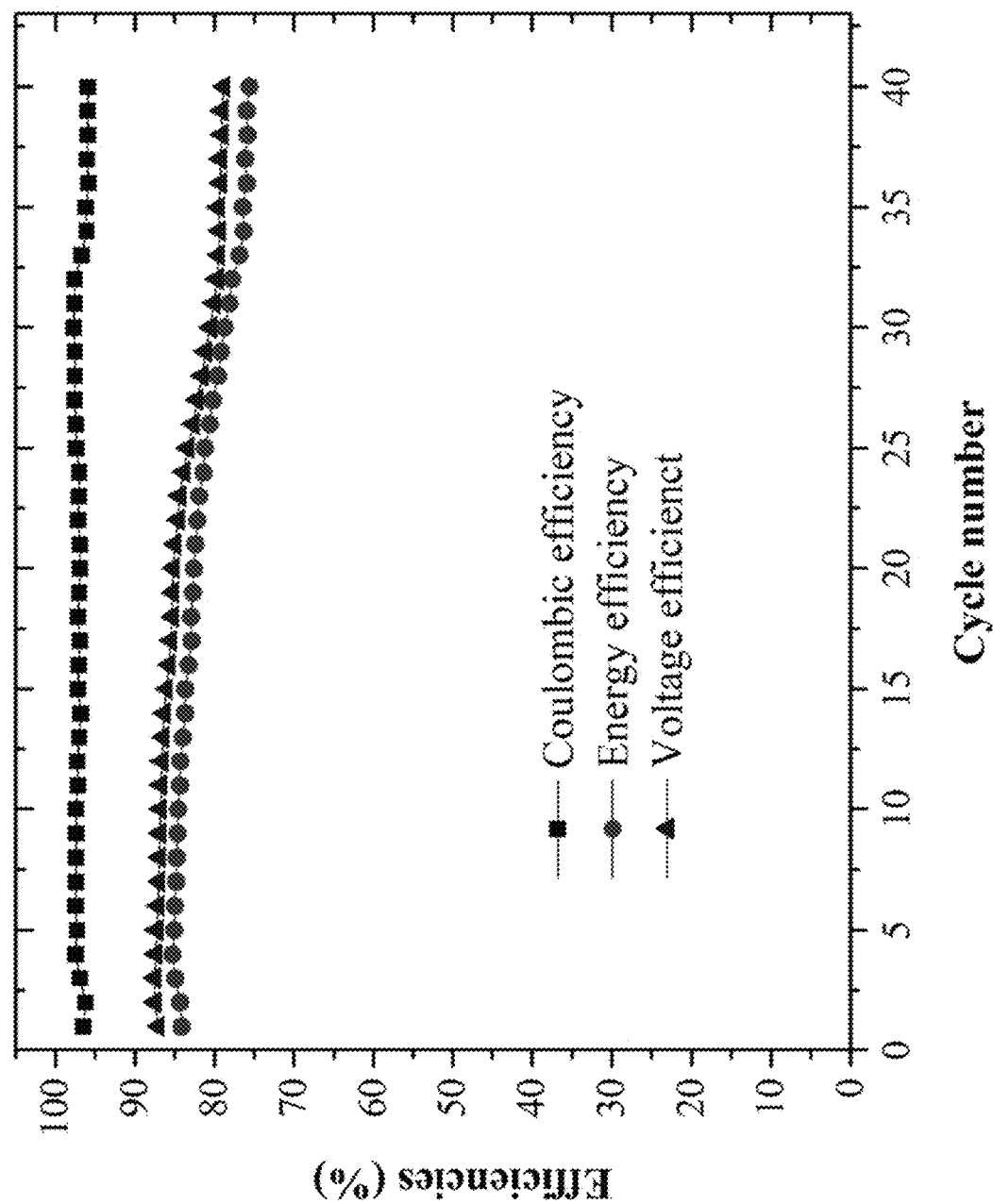
FIG. 26 is an exemplary embodiment of electrode-decoupled V—Ce RFB efficiencies with r-SEBS-TMA membrane separator in accordance with the present disclosure.

The introduction (by cross-over) of new cations to the anolyte and catholyte respectively also accounts of the observation of a new voltage plateaus in the charge-discharge profiles of the ED-RFB employing Nafion®-212. The OCVs and capacity fade in ED-RFBs employing the AEMs follows the ex-situ permselectivity trends of the AEMs with r-SEBS30-TMA enabling higher OCV and lower capacity fade compared to SEBS30-TMA. FIGS. 25A-25B depict the long-term cycling data for these ED-RFBs. At 20 cycles, SEBS30-TMA exhibited 10% loss in initial capacity (0.5% per cycle) and Nafion®-212 exhibited a 40% loss (2% per cycle). In comparison, the capacity fade for the V—Ce ED-RFB employing r-SEBS30-TMA was 0% within experimental error in the first 20 cycles. Upon further extended cycling to 40 cycles, a 2% loss of capacity was observed. Thus, averaging the capacity losses over the course of the entire 40 cycles, only 0.05% capacity loss per cycle was observed. Other repeats of this experiment resulted in even lower capacity fade values per cycle, leading to measured capacity fade as a result of leakages and/or electrolyte loss by other means rather than due to cross-over. This also serves to explain the drop in energy efficiency observed in the r-SEBS30-TMA ED-RFB. The decrease in the energy efficiency in the other ED-RFBs correlated to cation cross-over with the cations that crossover being electro-inactive at their opposite electrode. FIG. 26 depicts the coulombic, voltage and energy efficiencies of the r-SEBS30-TMA ED-RFB. The coulombic efficiency is as close to 100% as expected. Depending on the embodiment, drop in voltage efficiency and hence energy efficiency may be attributed to common engineering issues during long-term cell cycling such as electrolyte leakage, ohmic losses and possible unbalanced states of charge in the anolyte and catholyte upon some loss of either electrolyte.

Figure 27A:
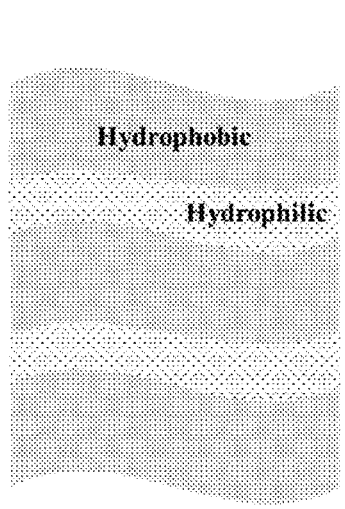
FIGS. 27A-E depict an exemplary embodiment of a mechanism of improved permselectivity in reinforced separators in accordance with the present disclosure.
Figure 27B:
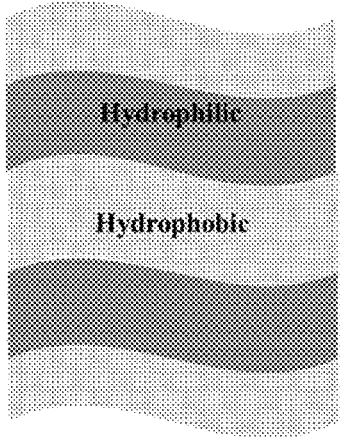
Figure 27C:
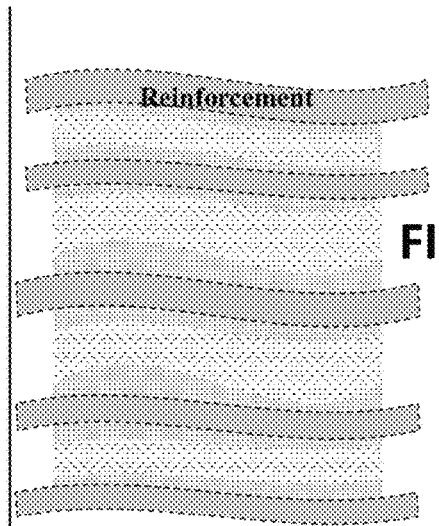
Figure 27D:
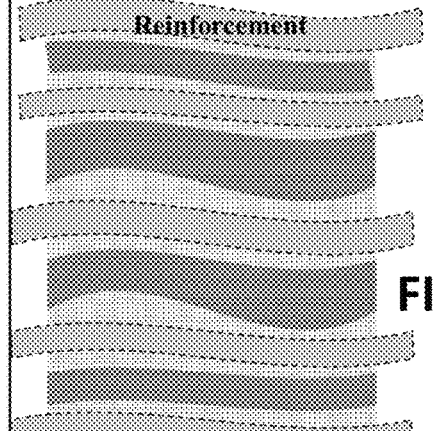
Figure 27E:
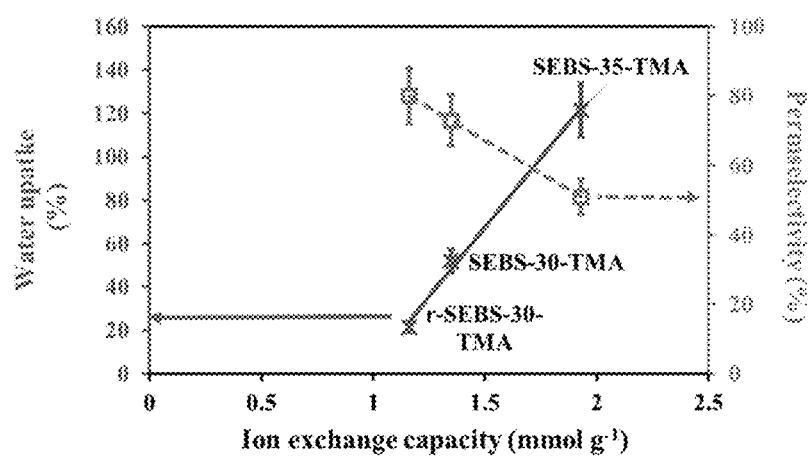

FIGS. 27A-27E summarizes the mechanism underlying this improved performance of ED-RFBs employing reinforced separators. As seen in panels FIGS. 27C and 27D, the introduction of the porous reinforcement layer decreases the size of the ion-conductive hydrophilic domains. Upon water uptake when assembled in an electrochemical system, the hydrophilic domain size increase is restricted by the reinforcement layer while unreinforced AEMs take up more water and swell more as seen in panels FIGS. 27A and 27B. Thus, as seen in FIG. 27E, an inverse correlation exists between water uptake and permselectivity, and significant improvements in permselectivity are possible (by employing reinforcement layers) even with minimal drops in IEC.

Conclusions

The introduction of reinforcement layers into block co-polymer AEMs results in the disruption and decrease in their ionic domain size. This effect significantly increases permselectivity while simultaneously improving mechanical properties of these separators. SEBS30-TMA AEMs achieve permselectivity values comparable to commercial, benchmark AEMs (Tokuyama A201) upon employing this strategy. Such r-SEBS30-TMA separators significantly improved lifetimes of ED-RFBs by decreasing per cycle capacity fade from 0.5% to <0.05%. This 10× improvement in operando permselectivity opens the door to ED-RFBs employing inexpensive elemental actives achieving decades-long usable lifespans.

This written description uses examples to illustrate the present disclosure, including the best mode, and also to enable any person skilled in the art to practice the disclosure, including making and using any compositions or systems and performing any incorporated methods. The patentable scope of the disclosure is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

As used herein, the terms "comprises," "comprising," "includes," "including," "has," "having," "contains", "containing," "characterized by" or any other variation thereof, are intended to cover a non-exclusive inclusion, subject to any limitation explicitly indicated. For example, a composition, mixture, process or method that comprises a list of elements is not necessarily limited to only those elements but may include other elements not expressly listed or inherent to such composition, mixture, process or method.

The transitional phrase "consisting of" excludes any element, step, or ingredient not specified. If in the claim, such would close the claim to the inclusion of materials other than those recited except for impurities ordinarily associated therewith. When the phrase "consisting of" appears in a clause of the body of a claim, rather than immediately following the preamble, it limits only the element set forth in that clause; other elements are not excluded from the claim as a whole.

The transitional phrase "consisting essentially of" is used to define a composition or method that includes materials, steps, features, components, or elements, in addition to those literally disclosed, provided that these additional materials, steps, features, components, or elements do not materially affect the basic and novel characteristic(s) of the claimed disclosure. The term "consisting essentially of" occupies a middle ground between "comprising" and "consisting of".

Where a disclosure or a portion thereof is defined with an open-ended term such as "comprising," it should be readily understood that (unless otherwise stated) the description should be interpreted to also describe such a disclosure using the terms "consisting essentially of" or "consisting of."

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, the indefinite articles "a" and "an" preceding an element or component of the disclosure are intended to be nonrestrictive regarding the number of instances (i.e. occurrences) of the element or component. Therefore "a" or "an" should be read to include one or at least one, and the singular word form of the element or component also includes the plural unless the number is obviously meant to be singular.

What is claimed is:

1. A redox flow battery comprising:
   a cathode;
   a catholyte comprising a transition metal ion and a first supporting electrolyte wherein the transition metal ion and the first supporting electrolyte form a first solvation structure having a diameter in a range of from about 0.1 nm to about 3 nm;
   an anode;
   an anolyte comprising a lanthanide ion and a second supporting electrolyte, wherein the lanthanide ion and the second supporting electrolyte form a second solvation structure having a diameter in a range of from about 0.1 nm to about 3 nm; and
   a permselective ion exchange membrane separating the cathode and the catholyte from the anode and the anolyte.

2. The redox flow battery of claim 1, wherein the first supporting electrolyte and the second supporting electrolyte are identical.

3. The redox flow battery of claim 1, wherein at least one of the first supporting electrolyte and the second supporting electrolyte do not comprise sulfuric acid.

4. The redox flow battery of claim 1, wherein the first supporting electrolyte and the second supporting electrolyte are each independently a sulfonic acid selected from the group consisting of alkyl sulfonic acids, aryl sulfonic acids, methanesulfonic acid, ethanesulfonic acid, benzenesulfonic acid, o-toluenesulfonic acid, m-toluenesulfonic acid, p-toluenesulfonic acid, halogenated derivatives thereof, and combinations thereof.

5. The redox flow battery of claim 1, wherein the lanthanide ion is selected from the group consisting of La, Pr, Nd, Pm, Sm, Eu, Gd, Tb, Dy, Ho, Er, Tm, Yb, Lu, and combinations thereof.

6. The redox flow battery of claim 1, wherein the lanthanide ion comprises Ce.

7. The redox flow battery of claim 1, wherein the transition metal ion is selected from the group consisting of Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, Hg, and combinations thereof.

8. The redox flow battery of claim 1, wherein the transition metal ion is selected from the group consisting of Ti, V, and combinations thereof.

9. The redox flow battery of claim 1, wherein the permselective ion exchange membrane is selected from the group consisting of an anion exchange membrane and a proton exchange membrane.

10. The redox flow battery of claim 1, wherein the permselective ion exchange membrane is selected from the group consisting of membranes comprising SEBS membranes, quaternized cardo polyetherketone (QPEK) membranes, PTFE reinforced anion exchange membranes, block copolymers thereof, and combinations thereof.

11. The redox flow battery of claim 1, wherein the capacity fade over 100 charge-discharge cycles is less than 0.1%.

12. A method of using a redox flow battery:
the method comprising using the redox flow battery to store energy,
wherein the redox flow battery comprises:
  a cathode;
  a catholyte comprising a transition metal ion and a supporting electrolyte, wherein the transition metal ion and the supporting electrolyte form a first solvation structure having a diameter in a range of from about 0.1 nm to about 3 nm;
  an anode;
  an anolyte comprising a lanthanide ion and a supporting electrolyte, wherein the lanthanide ion and the supporting electrolyte form a second solvation structure having a diameter in a range of from about 0.1 nm to about 3 nm; and,
  a permselective ion exchange membrane separating the cathode and the catholyte from the anode and the anolyte.

* * * * *